(12) United States Patent
McConnell

(10) Patent No.: US 8,918,347 B2
(45) Date of Patent: Dec. 23, 2014

(54) METHODS AND SYSTEMS FOR COMPUTER-BASED SELECTION OF IDENTIFYING INPUT FOR CLASS DIFFERENTIATION

(76) Inventor: Robert K. McConnell, Arlington, MA (US)

( * ) Notice: Subject to any disclaimer, the term of this patent is extended or adjusted under 35 U.S.C. 154(b) by 434 days.

(21) Appl. No.: 13/446,181

(22) Filed: Apr. 13, 2012

(65) Prior Publication Data

US 2013/0268465 A1    Oct. 10, 2013

Related U.S. Application Data

(60) Provisional application No. 61/622,509, filed on Apr. 10, 2012.

(51) Int. Cl.
*G06F 15/18* (2006.01)
*G06N 99/00* (2010.01)

(52) U.S. Cl.
CPC .................................. *G06N 99/005* (2013.01)
USPC .......................................................... 706/12

(58) Field of Classification Search
None
See application file for complete search history.

(56) References Cited

U.S. PATENT DOCUMENTS

| | | |
|---|---|---|
| 4,567,610 A | 1/1986 | McConnell |
| 5,741,980 A | 4/1998 | Hill et al. |
| 7,007,001 B2 | 2/2006 | Oliver et al. |
| 7,639,896 B2 | 12/2009 | Sun et al. |

OTHER PUBLICATIONS

Skurichina, M. et al. "Effectiveness of Spectral Band Selection/Extraction Techniques for Spectral Data". Structural, Syntactic, and Statistical Pattern Recognition. Lecture Notes in Computer Science vol. 4109, 2006, pp. 541-550. DOI:10.1007/11815921_59.*
Ahlberg, J. et al. "An information-theoretic approach to band selection". Proc. SPIE 5811, Targets and Backgrounds XI: Characterization and Representation, 15 (2005). DOI:10.1117/12.607136.*
J. M. Sotoca, F. Pla, and J. S. Sanchez, "Band selection in multispectral images by minimization of dependent information", IEEE Trans. Systems, Man, and Cybernetics (Part C), 37(2): 258-267, Mar. 2007.
P. Viola and W. Wells, "Alignment by maximization of mutual information", International Journal of Computer Vision, 24(2):137-154, 1997.

(Continued)

*Primary Examiner* — Li-Wu Chang
*Assistant Examiner* — Benjamin Buss
(74) *Attorney, Agent, or Firm* — Maura K. Moran

(57) ABSTRACT

In systems and methods for computer-based selection of identifying input for differentiating classes, training regions (each of which is associated with a defined class) are specified in a training space that is organized by data bands according to selected definitions. Windows are defined in training elements associated with data locations in the training regions. Multiple training windows are defined in the training elements in a known band in the training data. Relevance measures for training windows represent an extent of likelihood of correctly identifying class for a test location based on data band, window position within the training element, and the frequency of occurrence of data symbols in training windows at the window position. The window having the highest value relevance measure is selected as the most relevant window. Multiple most relevant windows, together with their parameters, are selected as identifying input to facilitate class differentiation in test spaces.

28 Claims, 13 Drawing Sheets

(56) References Cited

OTHER PUBLICATIONS

X. Zeng, S. Karthick, T. S. Durrani, J. Gilchrist, "Exploiting Copulas for Optimising Band Selection for Hyperspectral Image Data Sequences", Proceedings of University of Strathclyde's Second Annual Academic Hyperspectral Imaging Conference, May 17-18, 2011.

C. Cariou, K. Chehdi, and S. Le Moan, "BandClust: an unsupervised band reduction method for hyperspectral remote sensing," IEEE Geoscience and Remote Sensing Letters, 8(3):564-568, May 2011.

R. McConnell, email dated Jun. 3, 2012, forwarding email from C.Cariou, dated Jun. 3, 2012, regarding Cariou 2011 (ref. 1).

B. Guo, R. I. Damper, S. R. Gunn, and J. D. B. Nelson, "A fast separability-based feature-selection method for high-dimensional remotely sensed image classification," Pattern Recognition, 41(5): 1653-1662, May 2008.

B. Guo, S. R. Gunn, R. I. Damper and J. D. B. Nelson, "Band selection for hyperspectral image classification using mutual information," IEEE Geoscience and Remote Sensing Letters, 3(4): 522-526, Oct. 2006.

J. Ren, T. Kelman and S. Marshall, "Adaptive clustering of spectral components for band selection in hyperspectral imagery", Proceedings of University of Strathclyde's Second Annual Academic Hyperspectral Imaging Conference, May 17-18, 2011.

M. R. Sabuncu, "Entropy-based Image Registration", Ph.D. Thesis, Princeton University, Nov. 2006.

S. B. Serpigo and G. Moser, "Extraction of Spectral Channels From Hyperspectral Images for Classification Purposes", IEEE Transactions on Geoscience and Remote Sensing, vol. 45, No. 2, Feb. 2007.

C. E. Shannon, "The mathematical theory of communication", Bell System Technical Journal, 27, 379 and 623, 1948.

* cited by examiner

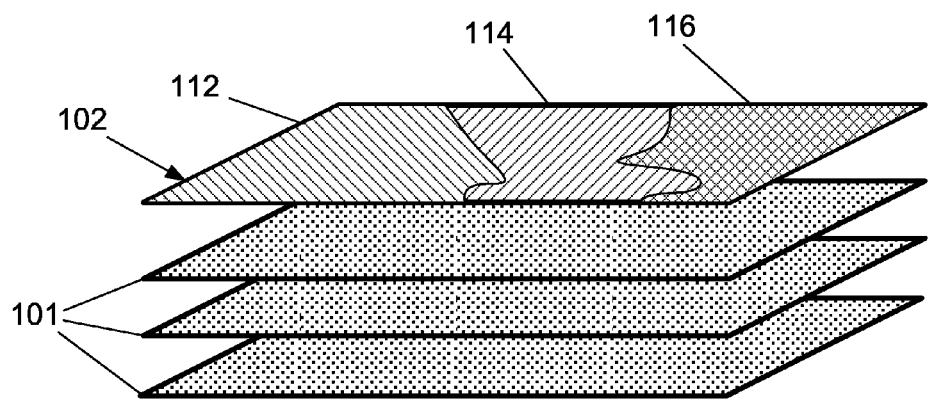
FIG.1
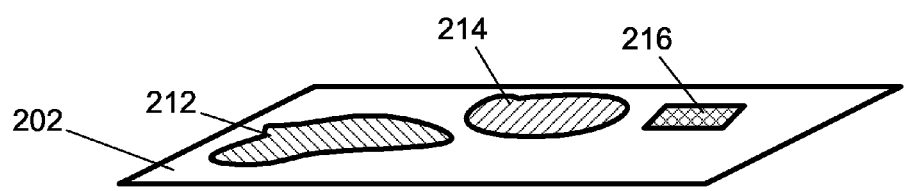
FIG.2A
| Index $j$ | Name | Class Symbol | Pixel Count | $p(c_j)$ | $\log_2(p(c_j))$ | $p(c_j)\log_2(p(c_j))$ |
|---|---|---|---|---|---|---|
| 1 | Lake | 00 | 1000 | 0.500 | -1.000 | -0.500 |
| 2 | Forest | 01 | 800 | 0.400 | -1.322 | -0.529 |
| 3 | Field | 10 | 200 | 0.100 | -3.322 | -0.332 |
| Sum | | | 2000 | 1.000 | | -1.361 |
| Entropy | | | | | | 1.361 |
FIG.2B FIG.3B (High order bits)

FIG.3C (Low order bits)

FIG.4B (High order bits)

FIG.4C (Low order bits)

| Data Index ($k$) | Data Symbol | Lake 00 | Forest 01 | Field 10 | Count $n(d_k)$ | $p(d_k)$ | $p(d_k) \cdot \log_2(p(d_k))$ |
|---|---|---|---|---|---|---|---|
| 1 | 000 | 0 | 101 | 0 | 101 | 0.0505 | -0.2175 |
| 2 | 001 | 16 | 409 | 9 | 434 | 0.2170 | -0.4783 |
| 3 | 010 | 0 | 198 | 38 | 236 | 0.1180 | -0.3638 |
| 4 | 011 | 52 | 55 | 112 | 219 | 0.1095 | -0.3494 |
| 5 | 100 | 100 | 0 | 29 | 141 | 0.0705 | -0.2697 |
| 6 | 101 | 219 | 29 | 12 | 260 | 0.1300 | -0.3826 |
| 7 | 110 | 502 | 7 | 0 | 509 | 0.2545 | -0.5024 |
| 8 | 111 | 99 | 1 | 0 | 100 | 0.0500 | -0.2161 |
|  |  | 1000 | 800 | 200 | 2000 | 1.0000 | -2.7800 |
|  |  |  |  |  |  |  | 2.7800 |

| Index $j$ | Index $k$ | Symbol $c_j$&$d_k$ | Count $n(c_jd_k)$ | $p(c_jd_k)$ | $p(c_jd_k) \cdot \log_2(p(c_jd_k))$ | $n(c_jd_k) \cdot \log_2(n(c_jd_k))$ |
|---|---|---|---|---|---|---|
| 1 | 1 | 00 000 | 0 | 0.0000 | 0.0000 | 0.0 |
| 1 | 2 | 00 001 | 16 | 0.0080 | -0.0557 | 64.0 |
| ... | ... | ... | ... | ... | ... | ... |
| 1 | 8 | 00 111 | 99 | 0.0495 | -0.2147 | 656.3 |
| 2 | 1 | 01 000 | 101 | 0.0505 | -0.2175 | 672.5 |
| 2 | 2 | 01 001 | 409 | 0.2045 | -0.4683 | 3548.5 |
| ... | ... | ... | ... | ... | ... | ... |
| 2 | 8 | 01 111 | 1 | 0.0005 | -0.0055 | 0.0 |
| 3 | 1 | 10 000 | 0 | 0.0000 | 0.0000 | 0.0 |
| 3 | 2 | 10 001 | 9 | 0.0045 | -0.0351 | 28.5 |
| ... | ... | ... | ... | ... | ... | ... |
| 3 | 8 | 10 111 | 0 | 0.0000 | 0.0000 | 0.0 |
| Sum | | | 2000 | 1.0000 | -3.2808 | 15369.9 |
| Entropy | | | | | 3.2808 | |

FIG.6

| | |
|---|---|
| H($C$) - Class Entropy | 1.3610 |
| + H($D$) - Data Entropy | 2.7800 |
| − H($C$&$D$) - Joint Entropy | 3.2808 |
| = Relevance | 0.8601 |
| Uncertainty | 0.5008 |

FIG.7

METHODS AND SYSTEMS FOR COMPUTER-BASED SELECTION OF IDENTIFYING INPUT FOR CLASS DIFFERENTIATION

CROSS-REFERENCE TO RELATED APPLICATION

This application claims priority to U.S. Provisional Application 61/622,509, entitled METHOD AND SYSTEMS FOR COMPUTER-BASED SELECTION OF IDENTIFYING INPUT FOR CLASS DIFFERENTIATION and filed Apr. 10, 2012.

FIELD

The present invention relates to the field of data classification, and more particularly to computer-based selection of identifying input for class differentiation, also referred to herein as location of most relevant data.

BACKGROUND

Modern acquisition systems can often acquire large amounts of data that can potentially be used to associate subsets of that data to one of a finite set of classes. These classes may or may not be known at the time the data is collected.

However, once the classes of interest are specified only a part of the data may be relevant for differentiating these classes; much of the data may become irrelevant for this specific classification. The irrelevance can result from an absence of any information that by itself could contribute to the classification, or by the presence of information that could contribute to the classification but is redundant with other information already selected for inclusion in the classification operation.

Even individual data values may contain irrelevant information in the representation; for example high order positions may remain invariant or nearly invariant for all the classes of interest, low order positions may consist largely or entirely of random noise.

In many cases, there are advantages to differentiating between data that is relevant to the classification and data that is irrelevant. These include savings in bandwidth requirements resulting from the ability to save the most relevant data while discarding and/or not transmitting data that is known to be irrelevant. In other cases the advantages may lie in the ability to not collect or even not generate data that has been determined to be unnecessary for the classification.

One example of where such differentiation can be advantageous is in the interpretation of multispectral and hyperspectral "images". The normal human eye can combine images from three different spectral bands "red", "green", and "blue" and interpret the combination as a "color". Multispectral and hyperspectral images portray the same image scene in four or more, even hundreds, of bands and therefore can be very difficult for humans to interpret or even visualize.

Hyperspectral or multispectral images may be created in a variety of ways. The most common method is illuminating the scene with a broad spectrum source and using an imaging device that separates the incoming light so that light from each spectral band forms a separate image. Another method of creating such images is to illuminate a scene successively at different wavelengths using a tunable laser or other variable wavelength source. In this case the imaging device captures multiple images or "bands" in succession, one for each illumination wavelength band.

However hyperspectral images are generated, they contain large amounts of data. The problems with current hyperspectral image analysis resulting from high cost and complexity in dealing with such large volumes of data are well summarized by Jinchang Ren, Timothy Kelman and Stephen Marshall, "Adaptive clustering of spectral components for band selection in hyperspectral imagery", Proceedings of University of Strathclyde's Second Annual Academic Hyperspectral Imaging Conference, 17-18 May 2011 (hereinafter Ren et al. [2011]). To solve these problems, one practical solution is band selection, which aims to use fewer bands to represent the whole image while maintaining a good performance of analysis, i.e. removal of redundant information.

Ren et al. [2011] categorize the existing techniques for band selection into three main groups. The first group contains subspace-based approaches, which aim to project the original data onto certain subspace and extract the most discriminative components. Examples in this group include principal component analysis (PCA) and its variations, orthogonal subspace projection, and wavelet analysis.

The second group refers to optimization based feature selection approaches, using techniques like
- Neyman-Pearson detection-theory based thresholding of signal energy,
- Jeffries-Matusita distance based statistical significance test,
- constrained energy minimization,
- mutual information based (as disclosed by B. Guo, S. R. Gunn, R. I. Damper and J. D. B. Nelson, "Band selection for hyperspectral image classification using mutual information," IEEE Geoscience and Remote Sensing Letters, 3(4): 522-526, October 2006. (hereinafter Guo et al., [2006]) and B. Guo, R. I. Damper, S. R. Gunn, and J. D. B. Nelson, "A fast separability-based feature-selection method for high-dimensional remotely sensed image classification," Pattern Recognition, 41(5): 1653-1662, May 2008 (hereinafter Guo et al. [2008]),
- minimization of dependent information, as disclosed in J. M. Sotoca, F. Pla, and J. S. Sanchez, "Band selection in multispectral images by minimization of dependent information", IEEE Trans. Systems, Man, and Cybernetics (Part C), 37(2): 258-267, March 2007 (hereinafter Sotoca et al. [2007]),
- classification-based inter-class distance, as disclosed by Sebastiano B. Serpico and Gabriele Moser, "Extraction of Spectral Channels From Hyperspectral Images for Classification Purposes", IEEE Transactions on Geoscience and Remote Sensing, vol. 45, no. 2, February 2007 (hereinafter Serpico and Moser [2007]), and
- minimum estimated abundance covariance.

In the third group, clustering of bands is applied for dimensionality reduction, such as top-down hierarchical clustering using Ward's linkage criterion and Kullback-Leibler divergence measurement, minimizing mutual information in separating band ranges, as disclosed in C. Cariou, K. Chehdi, and S. Le Moan, "BandClust: an unsupervised band reduction method for hyperspectral remote sensing," IEEE Geoscience and Remote Sensing Letters, 8(3):564-568, May 2011 (hereinafter Cariou et al. [2011]) and correlation-based subset clustering.

For those interested in selecting a small subset of the existing image data to represent the whole image while maintaining a good performance of analysis, i.e. removal of redundant information, the first group of techniques mentioned by Ren et al. [2011], is not relevant. Except for the method of Sotoca et al. [2007], the second set of methods generally makes use of available information regarding the specific classes that need to be differentiated. It stands to reason that these supervised methods, making use of class information, are the methods most likely to be successful in differentiating the specified classes.

The third group of techniques mentioned above is generally concerned with unsupervised methods for removal of redundant information, methods that do not make use of available known class information. The latter are therefore less likely to be successful in selecting a data subset optimized for differentiating a prespecified set of classes.

The methods and systems described herein are concerned with an improved method of supervised data selection, a method that makes use of available information regarding the specific classes that need to be differentiated. As such, they belong primarily to the second group of techniques identified above.

The advantages of information theoretic measures, specifically mutual information, for correlation have become widely recognized in recent years. Imaging applications include image registration, as disclosed by M. R., Sabuncu, "Entropy-based Image Registration", Ph.D. Thesis, Princeton University, November 2006 (hereinafter Sabuncu [2006]); P. Viola and W. Wells, "Alignment by maximization of mutual information", *International Journal of Computer Vision*, 24(2): 137-154, 1997 (hereinafter Viola and Wells [1997]); U.S. Pat. No. 7,639,896 to Z. Sun et al., as well as the second and third groups of feature selection techniques. Ren et al. [2011] describe, in detail, a method belonging to the third group of techniques, unsupervised classification. Their method uses measurement of mutual information between adjacent bands to identify clusters of similar bands so that redundant information can be removed.

Serpico et al. [2007] emphasize the difference between feature selection and feature extraction. The latter attempts to reduce the number of features by constructing new features based on combining the original features. The methods described by Ren et al., would generally be considered to be unsupervised feature selection. Serpico et al. construct new features to reduce the dimensionality. They demonstrate supervised feature extraction methods for optimizing correlations between the new features, treated as continuous variables, and classes that can also be treated as continuous variables. As such their methods are not appropriate for differentiating classes based only on qualitative descriptions. They do not make use of mutual information.

Xuexing Zeng, Suvitha. Karthick, Tariq S Durrani, John Gilchrist, "Exploiting Copulas for Optimising Band Selection for Hyperspectral Image Data Sequences", Proceedings of University of Strathclyde's Second Annual Academic Hyperspectral Imaging Conference, 17-18 May 2011 (hereinafter Zeng et al. [2011]) cite the need to develop an automated process for selecting bands that carry significant information and rejecting bands that carry redundant information, for effective hyperspectral image analysis. They mention a joint histogram method of estimating mutual information.

In working with information theoretic methods it is common to organize data and other information as histograms, i.e. as used herein, intended to include broadly arrays of discrete elements in terms of frequency distribution vs. class interval or range, not necessarily normalized.

After mentioning the joint histogram method of estimating mutual information, Zeng et al. [2011] dismiss the method because of the difficulty of reliably determining the optimum number of histogram cells (also known as bins). They then describe a method of estimating mutual information among spectral bands treated as continuous information in order to identify bands with strongest correlation with a reference image and minimum correlation with other bands. Whatever the potential advantages of their method for unsupervised band selection, if applied to supervised band selection it suffers from the need to approximate the true joint probability distribution function by an assumed one.

Guo et al. [2008] select and rank a number of bands based on approximate measures of mutual information between pairs of bands that are well correlated with the class but poorly correlated with one another. One mutual information calculation is required for each possible two-band combination. Therefore the number of required mutual information calculations increases very rapidly, roughly in proportion to the square of the number of bands present.

Guo et al. [2008] also emphasize the well-known fact that for a direct implementation of mutual information when multiple bands are involved the number of required histogram cells can quickly become unmanageable. Also, with a large cell count, the amount of available data may be insufficient to produce a representative population of the cells.

An additional disadvantage of the method described by Guo et al. [2008] is that it does not provide a measure of the remaining uncertainty after each new band has been selected into the subset to be retained.

Mutual information has also been applied to a wide variety of classification problems. For example U.S. Pat. No. 7,007, 001 to Oliver et al. describes a method of using mutual information between observations and hidden states to minimize classification errors.

Therefore, it is desirable to simply and efficiently identify relevant data for class differentiation, as well as more precisely identify parameters of the relevant data. It is also desirable to reduce the amount of data that needs to be inter alia generated, collected, transmitted, stored, and/or processed for future classification. It is further desirable to reduce in cost, time, and effort the selection of identifying input for class differentiation, and to improve the predictive quality of the identifying input.

SUMMARY

In systems and methods for computer-based selection of identifying input for differentiating classes, training regions (each of which is associated with a defined class) are specified in a training space that is organized by data bands according to selected definitions. Windows are defined in training elements associated with data locations in the training regions. Multiple training windows are defined in the training elements in a known band in the training data. Relevance measures for training windows represent an extent of likelihood of correctly identifying class for a test location based on data band, window position within the training element, and the frequency of occurrence of data symbols in training windows at the window position. The window having the highest value relevance measure is selected as the most relevant window. Multiple most relevant windows, together with their parameters, are selected as identifying input to facilitate class differentiation in test spaces.

Relevance measures are measures of mutual information between class and relatively small windows are used in training data to locate windows containing the most relevant data for differentiating a specified set of classes. One or more optional subsequent iterations repeat this process where the data consists of a combination of data from prior iterations together with that from new trial windows. Once the most relevant data windows have been identified, this information may be used to guide the generation, collection, transmission, storage and/or use of new data.

The systems and methods described herein make use of mutual information. They use supervised selection based on training data from specified classes and thus are able to determine an optimum data subset for differentiating that set of classes. Further, they do not need to measure the mutual information between all possible band pair combinations. Instead they require measurement of mutual information between class and data. The computational effort increases only in proportion to the number of available bands and the number of window positions of interest within those bands. This results in much more efficient location of an optimally relevant data subset when the number of bands is large.

The systems and methods described herein reduce the number of required histogram cells by finding and using only the most relevant data from a small window within any band and incorporating the data from previously selected bands into the search for new bands. Because the windows are small, for many practical applications the systems and methods described herein locate enough relevant data to successfully perform the desired classification before the number of histogram cells becomes too large or their population too sparse.

Even if class is characterized by subtle changes in value (changes in low order data bits) these most relevant data bits will be found automatically by the methods and systems described herein. This usually eliminates any need for data normalization often required by other methods.

By using "data symbols" extracted from small data windows, rather than treating the data values as samples drawn from a continuous distribution, the systems and methods described herein significantly reduce such issues related to mutual information estimation as selection of histogram cell size and count.

The systems and methods described herein use supervised classification. They use mutual information, do not need to treat classes as continuous variables, and do not need to construct new features to reduce the dimensionality.

Since only the data from the small "data windows" determined to be most relevant for differentiation of the specified classes need be retained, the data per retained band can be ⅓ or less of competing methods. This also significantly ameliorates memory space problems. By enforcing use of only the most relevant bits, histogram sizes can be reduced without resorting to the time-consuming effort of maintaining a dynamic list of co-occurrences.

At each stage in the identifying input selection process, the methods and systems described herein make it easy to estimate the amount of remaining uncertainty (amount of additional information required) for classifications based on only the data windows selected. For many applications it has been found that data from small windows from as few as three bands, or even fewer, is adequate to successfully classify to a useful certainty. When so few bands are found to be adequate for classification they can be combined into a false color image often suitable for direct interpretation by a human.

Accordingly, a method for computer-based selection of identifying input for differentiating classes is disclosed, in which a training region specifying module specifies a plurality of training regions in a training space. The training regions are representative of a plurality of defined classes, with each of the training regions being associated with one of the defined classes. The training data associated with the training space is organized into data bands according to selected definitions. In certain embodiments, at least one of the data bands is defined is based on the definition of at least one other data band.

Each of the data bands is associated with all of the training regions, and each of the training regions has at least one training location. At least one training location has a training element in each of the data bands, and the training element has a training element size that comprises a count of the number of bits in the training element.

A most relevant window module may determine a most relevant window among multiple training windows in training elements in a known band in the training data. A window comprises bits in a data element in the training data and has a value comprising a data symbol and a window size comprising a count of the number of bits in the window. Window size is less than or equal to the training element size. In further embodiments, the window size comprises a small number of bits relative to the element size.

The most relevant window module may develop, from the multiple training windows, a set of relevance measures. A relevance measure for a first training window represents an extent of likelihood of correctly identifying class for a first selected location in a testing space, when an element of the first selected location is in a data band that is defined according to the definition of the known data band, and when the first selected element has a window in a window position that is the same as the first window position of the first training window.

In further embodiments, a data histogram may be used to define the relevance measure, wherein the data symbol is used as a pointer into the data histogram. Further, a joint class and data histogram may be used in defining the relevance measure for the given window, with the concatenated combination of class and data symbols being used as a pointer into the joint class and data histogram.

The window having the highest value relevance measure in the set of relevance measures may be selected as the most relevant window, and an identifying input selection module selects the most relevant window, together with its associated data band, window position, and window size, as the identifying input for conducting the class differentiation. In certain embodiments, the identifying input is selected without reference to data in the training data that is not associated with the most relevant window.

In other embodiments, the method comprises determining, by the most relevant window module, an additional most relevant window for the training data. The most relevant window module may develop an additional set of relevance measures, in which a relevance measure for an additional training window associated with an additional element represents an extent of likelihood of correctly identifying class for the selected location. The most relevant window module may, select, as the additional most relevant window, the window having the highest value relevance measure in the additional set of relevance measures. Further, the identifying input selection module, may include the additional most relevant window, together with its associated data band, window position, and window size, as an additional identifying input for conducting the class differentiation.

In still further embodiments, training data associated with a previously selected relevant window may be combined with the data symbol of the previously selected most relevant window, to form additional combined training data having additional training elements, and additional training windows associated with the additional training elements, and with additional combined data symbols in the additional training elements. The additional set of relevance measures may be developed from the additional combined training data and the additional training windows.

In still further embodiments, the previously selected most relevant window comprises a most recently selected most relevant window. In still further embodiments, combining the training data associated with the previously selected relevant window comprises concatenating it with the data symbol of the previously selected most relevant window. Further, a given window for a given training element window may have a value comprising a class symbol representing the class with which the given training element is associated; and a concatenated combination of class and data symbols may be used to develop a relevance measure for the given window.

In still further embodiments, additional most relevant windows are selected until the highest value relevance measure of a determined most relevant window reaches a predetermined first value. In other embodiments, selection occurs until the number of data windows in the set of most relevant windows reaches a predetermined second value. In further embodiments, most relevant windows are selected until the difference between the value of relevance measure of a selected additional most relevant window and the previously most recently selected most relevant window is less than a predetermined third value. And in further embodiments, selection occurs until the number of bands associated with the set of most relevant windows reaches a predetermined fourth value.

In other embodiments, the set of most relevant data windows may be selected to select spectral band information from a hyperspectral or multispectral image or to specify bands for a tunable laser source. In other embodiments, the set may be selected to establish references for use in classifying regions of a test space based on the data bands and window position parameters associated with the set of most relevant windows. Further, they may be selected to establish references for use in classifying regions of a test space based on concatenated data from the data bands and window position parameters associated with of the set of most relevant windows.

In certain embodiments, the training data may be signals from acoustic or vibration sensing devices, and identifying inputs further comprise optimum parameters for acoustic or vibration based classification. When the training data is from electromagnetic field sensing devices, the identifying inputs may comprise optimum parameters for electromagnetic field based classification. When the training data is from signals from pressure sensing devices, the identifying inputs may comprise optimum parameters for pressure based classification. When the training data comprises signals from temperature sensing devices, the identifying inputs may comprise optimum parameters for temperature based classification. In other embodiments, the training data may be signals from motion sensing devices, and wherein the identifying inputs may be optimum parameters for motion-based classification. Further, when the training data is signals from sensors at one or more selected times, the training locations may represent time-series data.

In other embodiments, a system for selecting identifying inputs for class differentiation may comprise a processor and a non-transitory computer-readable medium encoding instructions for selecting identifying inputs for class differentiation and for execution by the processor. The instructions may include one or more modules, including a training region specifying module, a most relevant window module, and an identifying input selection module, for executing the methods described above.

In other embodiments, a computer program for selecting identifying inputs for class differentiation may be embodied on a non-transitory computer readable medium. The computer program may comprise modules encoding interrelated and interdependent processes, including one or more modules, including a training region specifying module, a most relevant window module, and an identifying input selection module. The computer program may be configured to perform the method described above.

One advantage of the methods and systems described herein is that the "data symbols" from the bands and data windows within those bands determined to be most relevant are in a form particularly well suited to be used as input for automated classification using the methods described in U.S. Pat. No. 4,567,610 to McConnell.

Additional objects and advantages of the systems and methods described herein will be set forth in part in the description which follows, and in part will be obvious from the description, or may be learned by practice of the systems and methods described herein. The objects and advantages of the systems and methods described herein will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 1 is a block diagram showing a hyperspectral image cube of a scene containing three classes of interest;

FIG. 2A is a block diagram showing class training regions for the image cube;

FIG. 2B is a table showing the calculation of class entropy;

FIG. 3B is a table showing calculation of uncertainty (entropy) for high-order bits from typical data values;

FIG. 3C is a table showing calculation of uncertainty (entropy) for low-order bits from typical data values;

FIG. 4B is a table showing calculation of the entropy of data symbols from window whose data symbols do not change;

FIG. 4C is a table showing calculation of the entropy of data symbols from window where all data symbols are equally likely;

FIG. 6 is a table showing the calculation of joint class and data entropy;

FIG. 7 is a table showing the calculation of relevance and remaining uncertainty based on class, data and joint class and data entropies;

DETAILED DESCRIPTION

Figure 3A:
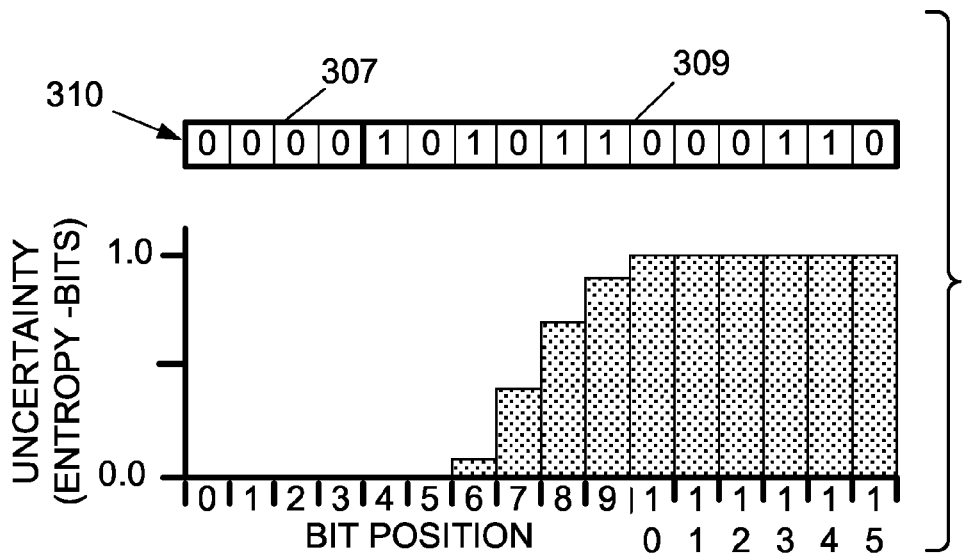
FIG. 3A is a chart showing a typical data value as stored in a computer and value uncertainty (entropy) as a function of position.

Reference will now be made in detail to the present exemplary embodiments, examples of which are illustrated in the accompanying drawings. Wherever possible, the same reference numbers will be used throughout the drawings to refer to the same or like parts. In the drawings, closely related figures have the same number but different alphabetic suffixes.

Information, or communication, theory provides a suitable frame of reference for understanding the powerful and versatile data location system of the systems and methods described herein. In communications, freedom of choice in selecting a message is closely related to information in that where the freedom of choice is large, so is the average amount of information necessary to specify any one choice; the more restricted the choice, the smaller the average amount of information that is necessary to specify a choice.

As an example of the method, consider a hyperspectral image of a scene 102 containing three classes of interest: lake 112, forest 114 and field 116 as illustrated in FIG. 1. The hyperspectral image, often referred to as an image cube, is composed of many individual digital images 101 of this same scene. Each image contains values proportional to light collected from a different portion of the spectrum, a spectral band. Some of the data may contain information that is especially well suited to differentiating the classes of interest, other data may be mostly irrelevant for this differentiation. If a subset of the data can be found that contains information most relevant to differentiating the classes of interest, in this case lake, forest, and field, then future classification may be more efficient and/or data collection, storage or transmission bandwidths may be significantly reduced by ignoring, discarding or never acquiring data which is known to be less relevant.

The method assumes that the classes of interest are known and one or more example image cubes 202 are available in which training regions, each containing predominately one class, can be identified for each class as illustrated in FIG. 2A. For the example case there would be one or more training regions for each of the lake 212, forest 214 and field 216 classes.

Class Information—FIGS. 1, 2A and 2B

Before determining where the most relevant information in the training regions is located, it is necessary to calculate the average amount of information that would be required to identify the class at a randomly chosen point in the training region set.

As mentioned earlier and as will become more apparent when this specific example is further presented below, it is preferred to organize the data as histograms, i.e. as used herein, intended to include broadly arrays of discrete elements in terms of frequency distribution vs. class interval or range, not necessarily normalized. Fortunately, digital data are well suited for use with histograms. For example, in image analysis, each pixel may have associated with it a class value and a variety of data values representing measurements from different data sources or sensors, different spectral bands from a single sensor etc. Each class is typically represented by a name or in a computer as a series of bits represented by ones and zeros. Each data value is typically represented as number represented symbolically by a series of decimal digits or in a computer as a series of bits represented by ones and zeros. By assigning such binary symbols to the classes these can serve as indicators or pointers to the specific cell in the class histogram where the individual class counts are accumulated. If there are two classes of interest then a single bit having value 0 or 1 will be enough to represent the specific class. If there are four or fewer classes, as in the present example, then two bits (e.g. 00,01,10) will be enough to represent the classes. As the number of classes to be distinguished increases so will the number of bits required.

To calculate the average amount of information that would be required to identify the class at a randomly chosen point in the training region set one must determine the relative area of each class in that set. In the hyperspectral image example, this can conveniently be done by accumulating the total number of pixels in the training region or regions for each class in a cell in a histogram. This is illustrated in FIG. 2B. In it are listed the classes of interest 222, each with an index 220 and a binary class symbol 224. For the example, the lake 212, forest 214 and field 216 training regions contain 1000, 800, and 200 pixels respectively resulting in a histogram as shown in the pixel count column 226. We sometimes refer to this class histogram as the j-histogram.

For the set of classes $C(c_1, c_2, \ldots, c_j, \ldots)$ Claude E. Shannon, "The mathematical theory of communication", *Bell System Technical Journal*, 27, 379 and 623, 1948 (hereinafter Shannon [1948]) showed that the average amount of information necessary to specify the class at a random location is represented by the entropy of the distribution. This entropy $H(C)$ is given by:

$$H(C) = -\sum_{j=1}^{J} p(c_j) \log_b(p(c_j)) \quad (1)$$

where:
  C is a set of the defined classes;
  J is the number of classes
  j is the class index;
  $c_j$ is the jth class in the set C;
  $p(c_j)$ represents the frequency of occurrence of class $c_j$ in the training regions, and b is the base of the logarithms used. If b=2 information will be measured in bits.

By dividing the histogram pixel count for each class by the total training set pixel count 227 one determines the probability $p(c_j)$ 228 for the class with index j 220 as shown in FIG. 2B. Then, calculating the logarithm of the probability 230 and multiplying the latter by the probability itself one arrives at a value for the contribution of each class, $p(c_j)\log_b(p(c_j))$ as shown in column 232 of FIG. 2B. By choosing the base of the logarithms b=2 the information and entropy measures will all be in bits, which is convenient for understanding the method. The entropy of the class distribution 236 is then given by the negative of the sum 234 of the values in column 232.

Data Information—FIGS. 3A, 3B, 3C, 4A, 4B and 4C

In the conventional representation of numbers, certain character positions are often referred to as "more significant", "most significant", "less significant" and "least significant". For example, in the number 172 the digit 1 would be termed the most significant digit and the digit 2 the least significant digit. In the following, for reasons that will become obvious, we will explicitly refrain from using the above terms. Instead, for decimal representations we will refer to the leftmost digit as the highest order digit and the rightmost digit as the lowest order digit, and will use similar terms for other number representation systems such as binary and hexadecimal.

Consider a number stored as a series of bits 310 in the computer representing a measured data value such as the one shown in FIG. 3A. Assume that the number of bits captured by the digitizing device, the measured data, is smaller than the number of bits in the natural storage unit of the computer. In this case it is customary to store the measured values 309 in the lower order bit positions. In the case where the measurement always represents a positive number the higher order bits 307 will be filled with zeros. An observer, viewing a large number of these measured values stored in a computer, but without any knowledge of their source, will see that the high order bits, including the padding and perhaps one or more adjacent bits, seldom change. With little uncertainty, he or she will be able to predict as yet unseen values. Similarly, the observer will note that the low order bits are highly variable and essentially unpredictable.

One way to quantify this uncertainty is to treat the number as a symbol or combination of symbols. Such treatment makes it easier to uncover certain types of relationships between classes and data.

Consider a subset $D(d_1, d_2, \ldots, d_k, \ldots)$ of the available data as a collection of K "data symbols", one for each possible data value. The average amount of information necessary to specify each item of the subset is the entropy of that subset $$H(D) = -\sum_{k=1}^{K} p(d_k)\log_b(p(d_k)) \quad (2)$$

where:
D is a set of possible data symbols,
K is the number of possible data symbols,
$d_k$ is the kth data symbol in the set D,
$p(d_k)$ represents the frequency of occurrence of data symbol $d_k$; in windows of the training elements in the training data at the given window position and the given data band; and again
b is the base of the logarithms used. If b=2 information will be measured in bits.

First consider the data value representation 310 as a combination of independent symbols each symbol occupying a single bit position. Then for any given position there are only two possible symbols, 0 and 1 324, and therefore K=2 and the index k ranges from 1 to 2 320.

In the example the symbols in the higher order bit positions of the data value never change. FIG. 3B illustrates the results of calculation of the entropy for these bit positions for 1000 samples. Column 326 contains the histogram of the number of occurrences of each possible symbol. The binary representation of the symbols 324, 0 or 1, serve as indices or pointers into this histogram. We refer to this as the k-histogram. The probability of occurrence of each symbol $p(d_k)$ is given by the count from the histogram divided by the total training set pixel count 227. These probabilities are shown in column 328. Column 332 shows the product $p(d_k)\log_2(p(d_k))$. Note that when $p(d_k)=0$, $p(d_k)\log_2(p(d_k))=0$. This is because $$\lim_{x \to 0} x \cdot \log(x) = 0$$

as x goes to zero more rapidly than log(x) goes to minus infinity. The entropy, H(D), 336 of the distribution of symbols for these high order bit positions is the negative of the sum 334 of the individual terms 332. In this case H(D)=0, consistent with the fact that on the average no additional information is necessary to specify the symbol that will appear in these bit positions whose contained symbols never change.

In contrast to the higher order bit positions, in the example the symbols in the lower order bit positions are equally likely to be 0 or 1. FIG. 3C illustrates the results of calculation of the entropy for a typical lower order bit position where there are 1000 samples and each of the symbols, 0 and 1, occurs exactly 500 times 326. Here the entropy H(D)=1.0 indicating that exactly one bit of information is necessary to specify the symbol in such a bit position.

As shown schematically in FIG. 3A, in the midrange bit positions the entropy typically increases rather rapidly from 0 bits to 1.0 bits as one moves from high order bit positions to the low order positions and the uncertainty in the data symbol increases.

While there may be occasions where it is useful to consider data values one bit position at a time, typically it is more useful to consider the information required to specify several adjacent bit positions.

Figure 4A:
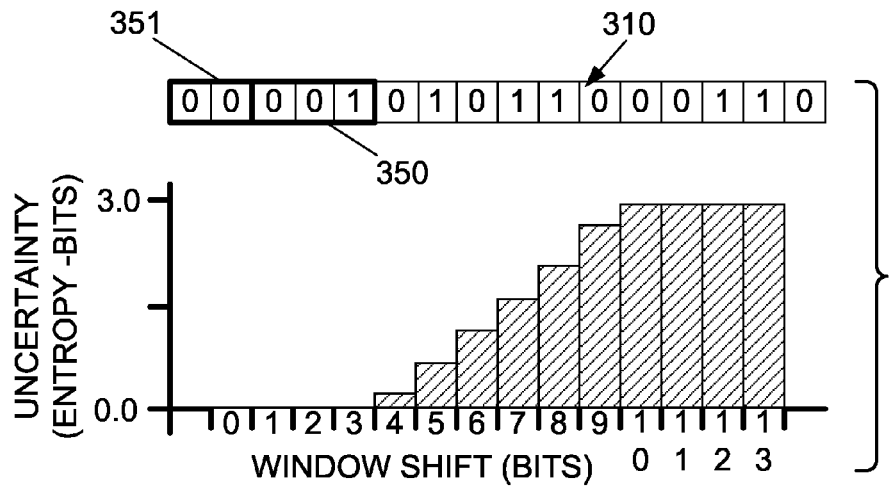
FIG. 4A is a chart showing a three bit data window superimposed on a typical data value and uncertainty (entropy) of the data symbols in that window as a function of window position.

FIG. 4A shows the same data value as FIG. 3A with a three bit window 350 that can be shifted along the data word. The portion of the number, the data symbol, within the window contains one of eight possible bit combinations: 000, 001, ... 111. Again, these bit combinations can be used as indices or pointers to the histogram cell where counts for this data symbol are accumulated. As has already been noted, the high order bits of this example are always zero so the entropy of the data symbols in this window, calculation of which is illustrated in FIG. 4B, is zero. Also, as already noted, the low order bits of the measured numbers are completely unpredictable with the probabilities of 0 or 1 in any bit position being essentially equal. An example calculation of the entropy when the window is in a low order bit region is shown in FIG. 4C. In this example it is assumed that the histogram 326 contains exactly 125 of each of the eight possible bit combinations. Substituting these values into Equ. (2) results in an entropy of 3.0 bits 336. As in the example of FIG. 3A and FIG. 3C, when there is an equal probability of 1 and 0 in each bit position, the entropy, the average amount of information needed to identify a bit pattern, is equal to the number of bits in the window.

FIG. 4A shows schematically how the entropy of the data symbols typically increases from 0.0 bits to 3.0 bits as the data window shift 351 increases and the window encompasses lower order bits and the uncertainty in the value increases. It should be noted that in the case of the three bit window of FIG. 4A, the increase in entropy is somewhat more gradual than that for the single bit window of FIG. 3A.

Figures 5A, 5B:
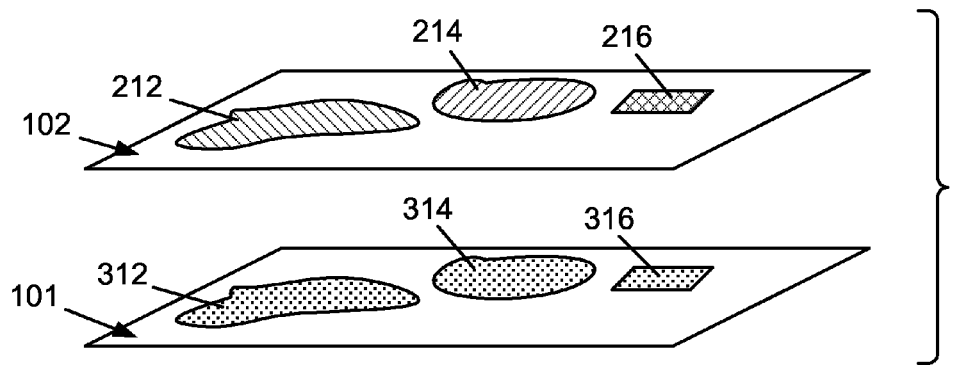
FIG. 5A is a block diagram showing class training regions for a hyperspectral image with corresponding data symbol locations for a single image plane (data band)
FIG. 5B is a table showing data histograms and illustrating calculation of data entropy.

Joint Class and Data Information—FIGS. 5A, 5B and 6

To locate the data relevant for a given classification, in addition to H(C), the information necessary to specify a class, and H(D), the information necessary to specify a specific subset of the data, it is necessary to determine the correlation between the class and data in the training set.

Consider the training regions of the hyperspectral image example (FIG. 5A). For each spectral band 101 and for each class: lake 212, forest 214 and field 216 there is a corresponding set of data values 312, 314 and 316.

At each location in a training region, for any one spectral band, we can concatenate the class and data symbols to form a new symbol, which we can designate as c&d. If there are J designated classes and K possible distinct data symbols then there are J×K possible combinations of c and d. The average amount of information necessary to specify any one of the combinations of class and data symbols is the entropy of the combinations. We refer to this as the joint entropy of class and data and represent it as H(C & D). A more common representation in the literature is H(C, D). The quantity is given by $$H(C\ \&D) = -\sum_{j=1}^{J}\sum_{k=1}^{K} p(c_j d_k)\log_b(p(c_j d_k)) \quad (3)$$

where:

$p(c_j d_k)$ represents the frequency of occurrence of combination $c_j d_k$, the kth data symbol in the windows of the training elements in the training data at the given window position and the given data band in association with the jth class.

When there is a one to one correspondence between class and data symbols $$H(C\&D) = H(C) = H(D) \quad (4)$$

because when either the class or the data symbol is known no additional information is necessary to uniquely identify the other. At the other extreme, when there is no correlation between class and data symbols $$H(C\&D) = H(C) + H(D) \quad (5)$$

because knowing either the class or the data in no way decreases the information necessary to specify the other.

Data Relevance Determination—FIGS. 2B, 5B, 6, 7 and 8

To estimate the potential contribution of any actual data subset to class determination we first make use of the fact that since H(C & D) is the amount of information necessary to specify both class and data symbols, the remaining uncertainty, the information required to completely specify the class once the data symbol is known, must be given by $$\text{uncertainty} = H(C\ \&D) - H(D) \quad (6)$$
$$= 0 \text{ when } C \text{ and } D \text{ are perfectly correlated and}$$
$$= C \text{ for no correlation between } C \text{ and } D.$$

This quantity is commonly referred to in the literature as "the conditional entropy of C given D" and commonly written as H(C|D). If the uncertainty is zero, this means that for each data symbol there is one and only one associated class. However, each class may have more than one associated data symbol. As the uncertainty increases, the probability that assigning the most likely class for a given data symbol will be incorrect increases.

To determine the relevant information in D, we note that it must be the original information necessary to specify C less the uncertainty remaining in the specification of C once D is known. It is thus given by $$\text{relevance} = H(C) - (H(C\ \&D) - H(D)) \quad (7)$$
$$= H(C) + H(D) - H(C\ \&D)$$

This quantity is also frequently referred to as "mutual information" or "information gain" in the literature. From Equ.(7) it is apparent that the relevance can be zero for one of two reasons. If data symbols never change, H(D)=0, H(C&D)=H(C), and the relevance value of the data becomes zero. Similarly, if there is no correlation between C and D, from Equ.(5) H(C&D)=H(C)+H(D); here also the relevance becomes zero.

To complete the set, it follows from Equ.(7) that the irrelevant information in D must be the original information in D less that part of the information that is relevant for specifying C:

$$\text{irrelevance} = H(D) - (H(C) + H(D) - H(C\ \&D)) \quad (8)$$
$$= H(C\ \&D) - H(C)$$

Selection of the most relevant data for classification thus reduces to finding combinations of bands, and specific window positions within these bands, that maximize the relevance defined in Equ.(7) or equivalently minimize the uncertainty defined in Equ. (6). In cases where several different combinations give rise to the same relevance, it would seem preferable to select the combination with the minimum irrelevance, Equ. (8)

It has already been shown (FIGS. 2B and 5B) how the class entropy H(C) and data symbol entropy H(D) can be calculated from histograms of the quantities involved. The procedure is essentially the same for calculating the joint class and data symbol entropy H(C &D). It has also been shown that data relevant for classification will not be found in bit positions where the entropy of the data symbols is zero, the high order bits in the example. Nor is the most relevant data likely to be found in the lowest order bits, which may contain a preponderance of random noise.

FIG. 5B shows an example joint class and data histogram 426 arranged as three columns, one for each class in the example, lake, forest and field. The binary class symbols 224 for each class are shown in the row immediately beneath the class names. Each column has eight histogram cells, one for each possible data symbol in a three bit window. Each cell of the histogram contains $n_{jk}$, the number of data symbols for class j with data symbol k. Accordingly we also refer to this as the jk-histogram.

The individual data symbol 324 and their indices 320 are shown in columns to the left of the histogram. The totals for each class 226 are shown beneath their respective columns. The latter are the same totals that were shown in the j-histogram used to calculate the class entropy 236 (FIG. 2B).

Immediately to the right of the jk-histogram 426 is a column 326 containing the sums over all classes of the counts for each data symbol, $$n(d_k) = \sum_{j=1}^{J} n(c_j d_k) \qquad (9)$$

Column 326 is itself a histogram, the data symbol histogram for the selected data window. The entropy of this data symbol histogram can be calculated in the usual manner. First, one divides each cell count by the total training set pixel count 227 to produce the probabilities $p(d_k)$ for that data symbol 328. Then one calculates and accumulates 334 the $p(d_k)\log_2(p(d_k))$ terms 332. The entropy of the example data symbol distribution, the second term necessary to evaluate the data symbol relevance, is 2.7800 bits, the negative of the sum 334. This term will always be less than or equal to the number of bits in the data window.

From the jk-histogram 426 one can see that all data symbols are not equally likely for all classes. While the data symbols of the classes overlap, lake data symbol numerical values tend to be the highest, forest data symbol numerical values the lowest and field data symbol numerical values somewhere in between. A reasonable observer seeing a data symbol of 000 would expect that it represented a forest region with a high degree of certainty. On the other hand, the same observer guessing that the data symbol 011 represented a field would expect to be correct just a little over 50 percent of the time. The entropy of this jk-histogram 326 provides H(C & D), the final quantity necessary to evaluate the relevance from Equ. (7) and an estimate of the probability of correctly inferring the class from the data symbol.

FIG. 6 illustrates the calculation of the entropy of the jk-histogram with the individual cell counts 426 from FIG. 5B rearranged into a column beside their indices j 220 and k 320 and their symbols 224 and 324. Again the concatenated symbols serve as a pointer to identify the specific histogram cell where a count is maintained for the symbol. The entropy of this joint class-data histogram can be calculated in the usual manner. First, one divides each count value 426 by the total training set pixel count 227 to produce the probabilities $p(c_j d_k)$ for that symbol 428. Then one calculates and accumulates 434 the $p(c_j d_k)\log_2(p(c_j d_k))$ terms 432. The entropy of the example data symbol distribution 436, the final term necessary to evaluate the data relevance, is 3.2808 bits, the negative of the sum 434. This term will always be less than or equal to the combined number of bits in class symbol and the data window, in this case five bits.

The relevance of the data symbols in the selected three data bit window can then be calculated as illustrated in FIG. 7.

The difference between the relevance and the class entropy 236 is 0.5008 bits which is a measure of the uncertainty. A reasonable interpretation of this number is that there is enough information in just the selected three data bit window of this band to achieve about $2^{-0.5008} \sim 71$ percent classification accuracy in an image with the proportions of classes used in the training regions on the basis of the values in a single pixel.

Although the method has been first illustrated using an entropy based relevance measure, as will be shown later, the calculations can be further simplified by using unnormalized total information terms. We shall refer to both of these, and any other similar terms that serve as criteria for choosing the most relevant data as "relevance measures".

Figure 8:
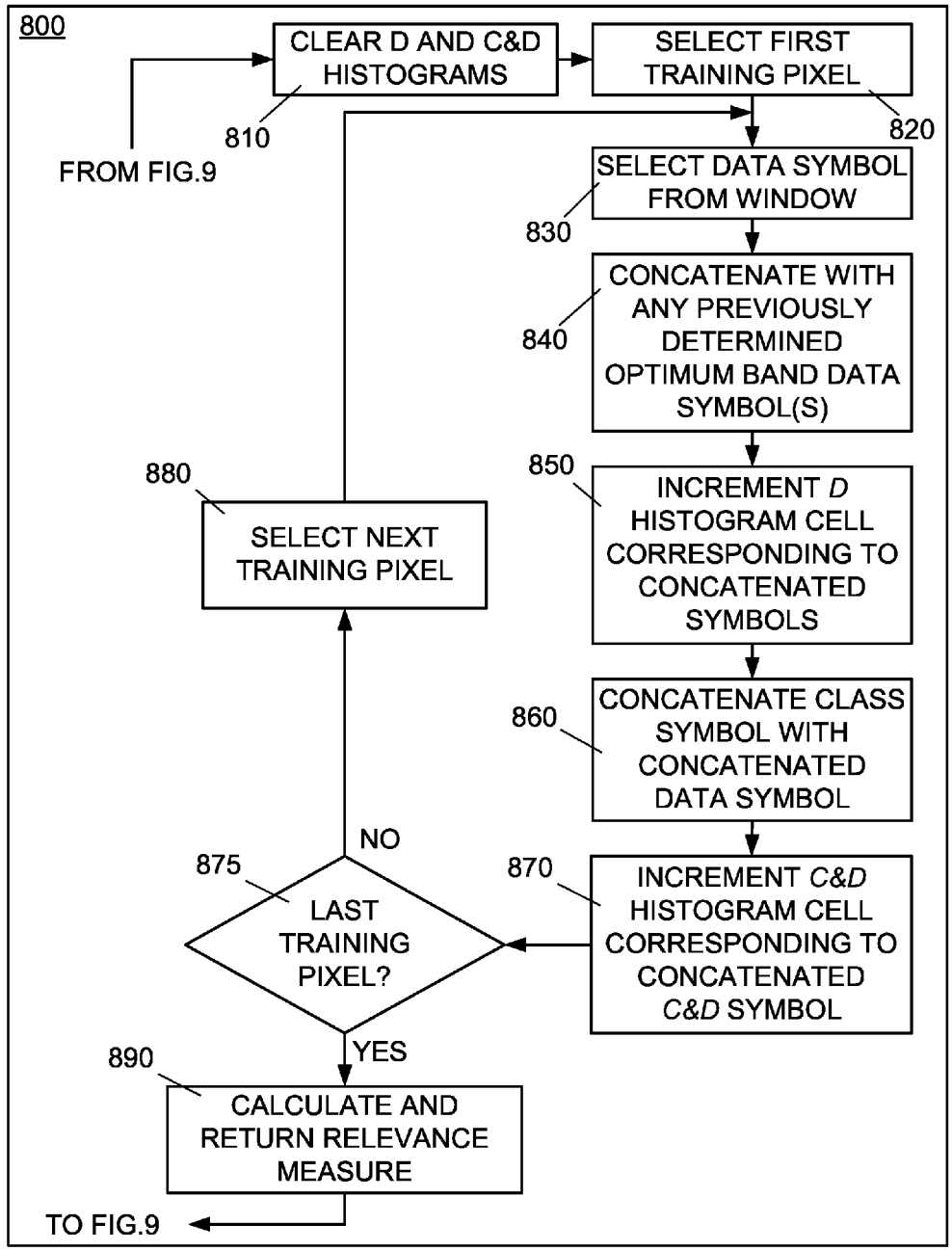
FIG. 8 is a flowchart illustrating a typical procedure for calculating a relevance measure for a single data window position of a single band.
Figure 13:
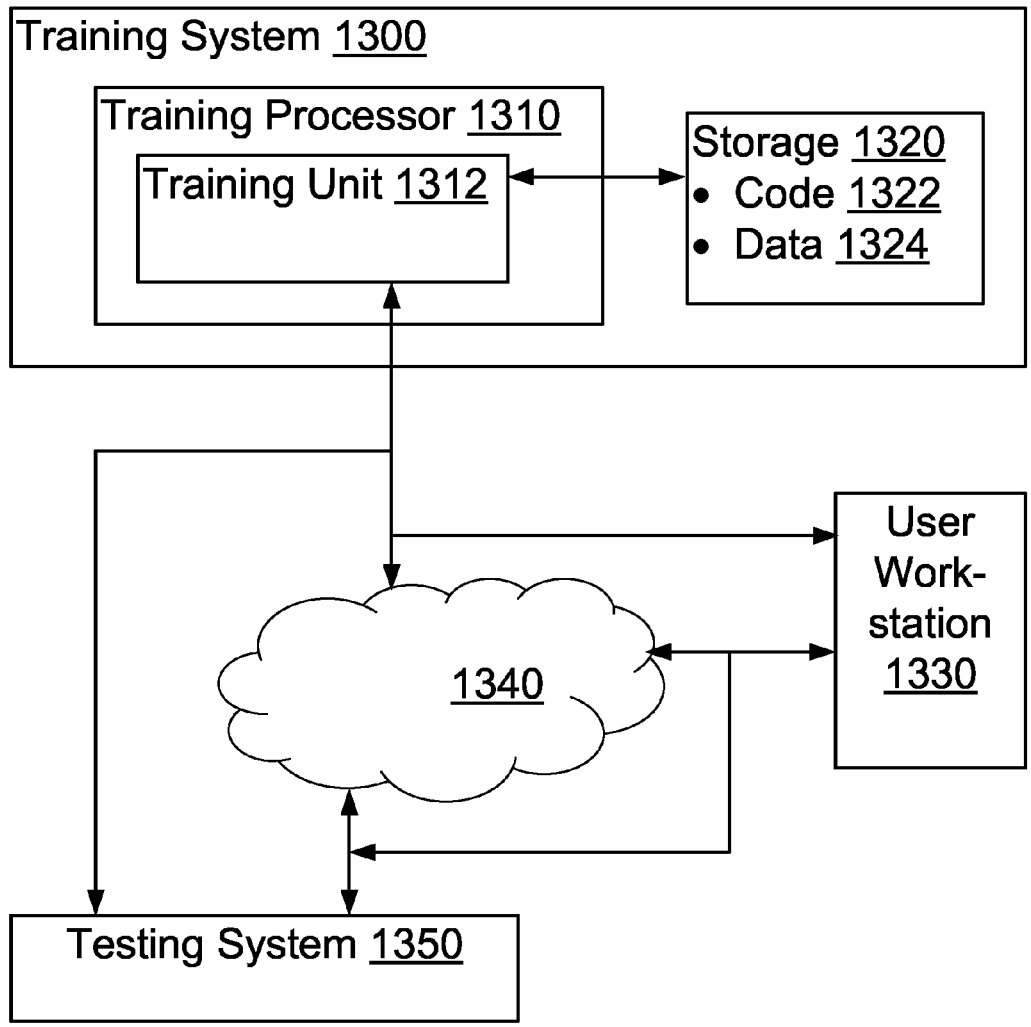
FIG. 13 is a block diagram of an exemplary computer-based system for selecting identifying input.
Figure 14:
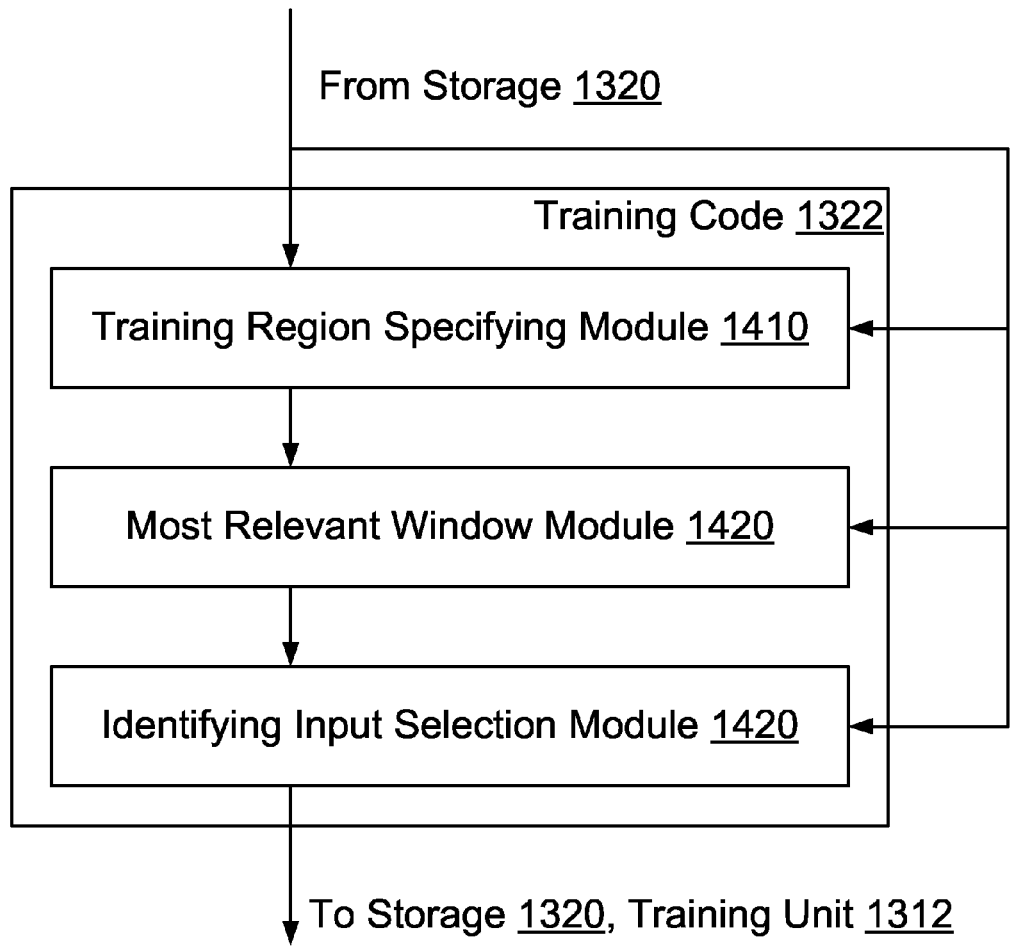
FIG. 14 is a block diagram of one embodiment of code 1322 that may be used in system 1300 shown in FIG. 13.

One embodiment of a process 800 for calculating a relevance measure for the selected data window position is illustrated in the flowchart of FIG. 8. The relevance measure for the window position being analyzed may be calculated in the training system 1300, shown in more detail in FIGS. 13-14, using the most relevant window module 1420 as shown in FIG. 14, with data 1324 that may be stored in the storage 1320.

At stage 810, C and D histograms are cleared in preparation of the calculation of relevant measures. At stage 820, the first training pixel may be selected, and, at stage 830, the data value is selected of the window in the first training pixel that is at the selected window position. At stage 840, the data associated with the pixel may be concatenated with any previously determined optimum data band data values as disclosed below to form concatenated training data and concatenated data symbols. At stage 850, the D histogram, which contains cells corresponding to the set of possible concatenated data symbols, is updated. The D histogram cell that corresponds to the concatenated data value, of the first training pixel, that is associated with the window position being analyzed is incremented. At stage 860, a class symbol is associated with the concatenated data, and at stage 870 the C&D histogram, which captures information about the number of times the kth data symbol occurs in the windows of training elements in the training data at the given window position and the given band in association with the jth class, is updated. The cell in the C&D histogram that correspond to the concatenated data value, of the first training pixel and associated with the given band in association with the jth class, that is associated with the window position being analyzed is incremented.

Stage 875 is a decision point. If training pixels remain unanalyzed, at stage 880, the next training pixel is selected and the stages 830, 840, 850, 860, and 870 are repeated to continue the process of filling in the D and C&D histograms. When, at stage 875, it is discovered that all of the pixels have been analyzed, at stage 890, the relevance measures for the pixels are calculated and returned.

Figure 9:
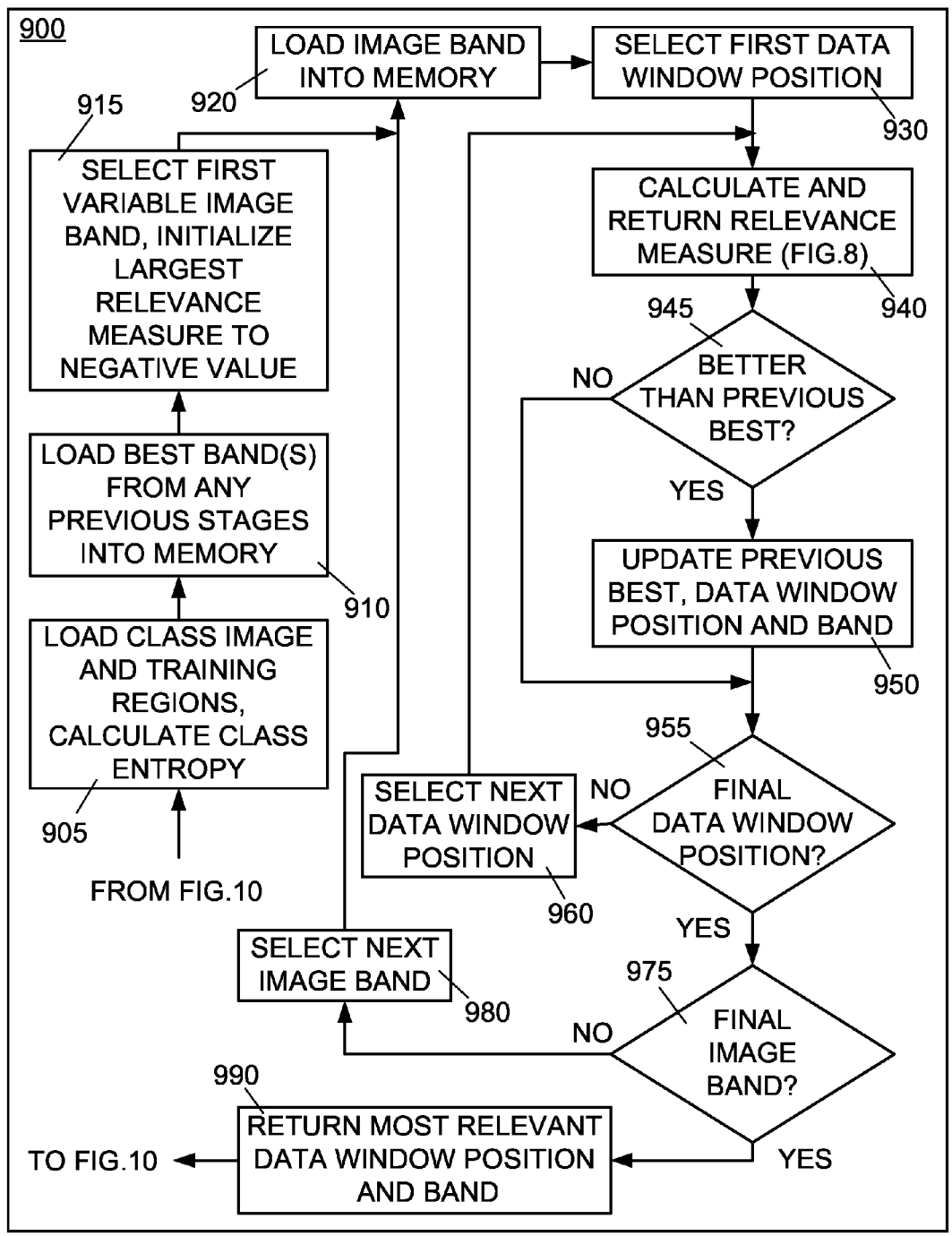
FIG. 9 is a flowchart illustrating one embodiment of a procedure for calculating the relevance measure using all shifts of the data window that might contain relevant information for all data window positions within all data planes that might contain relevant data for differentiating the specified classes of interest.

Determining the Most Relevant Data Window and Image Plane—FIGS. 4A and 9

By calculating the relevance using all shifts of the data window 350 (FIG. 4A) that might contain relevant information for an image plane 101 one can determine which window position within that plane contains the most relevant information for differentiating the specified classes of interest. By repeating this procedure for all data planes one can determine which plane, and window position within that plane contains the most relevant information for differentiating the specified classes of interest. This is illustrated by the flowchart shown in FIG. 9.

FIG. 9 is a flowchart illustrating one embodiment of a procedure 900 for calculating the relevance measure using all shifts of the data window that might contain relevant information for all data window positions within all data planes that might contain relevant data for differentiating the specified classes of interest.

Figure 12:
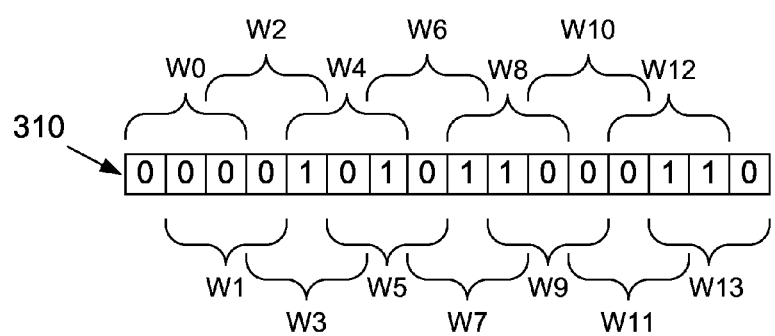
FIG. 12 is a diagrammatic representation of the possible 3-bit data windows in a 16 bit data value.

As shown in FIG. 9, at stage 905 the class image and training regions may be loaded from the storage 1320, and class entropy is calculated in the manner described herein. At stage 910, the best band(s) from previous stages may be loaded into memory in the training unit 1310. At stage 915, the first variable image band may be selected, and the largest relevance measure may be initialized to a negative value. At a stage 920, the image band may be loaded into the memory of the training unit 1310, and at a stage 930, a first data window position, such as shown in FIG. 12, may be selected. At a stage

940, a relevance measure for the first data window position is calculated. One embodiment for calculating the relevance measure for the first data window position was disclosed above with reference to FIG. 8.

If, at stage 945, it is determined that the relevance measure for the first data window position is better than the previously calculated best relevance measure, at stage 950 the most relevant window module 1420 may update the set of most relevant measures with the parameters (window position and band) of the newly identified relevance measure. If the previously best relevance measure is better than the newly calculated relevance measure, the set of most relevant measures is not updated.

At a stage 955, the module 1420 may determine whether all of the window positions have been analyzed. If all of the window positions have not yet been analyzed, at a stage 960, the module 1420 shifts the data window under analysis to select another, such as the next, window position. The process may then repeat stages 940, 950, and 960 to calculate the relevance measure of the newly selected window position and determine whether it is more relevant to classification than previously selected window positions.

If a stage 955, the module 1420 determines that all of the window positions have been analyzed, at a stage 975, the module 1420 may determine whether all of the image bands have been analyzed. If all of the possible window positions in elements in all of the possible image bands had not yet been analyzed, at a stage 980, the module 1420 selects another image band to analyze. The process may then repeat stages 920, 930, 940, 950, and 960 to calculate the relevance measure of the window positions in elements in the newly selected image band to determine whether any window positions in the elements of the newly selected image bands are better predictors of class than window/band combinations associated with previously calculated relevance measures. When, at stage 975, it is discovered that all of the bands have been analyzed, at stage 990, the most relevant data window position and band are returned.

Figure 10:
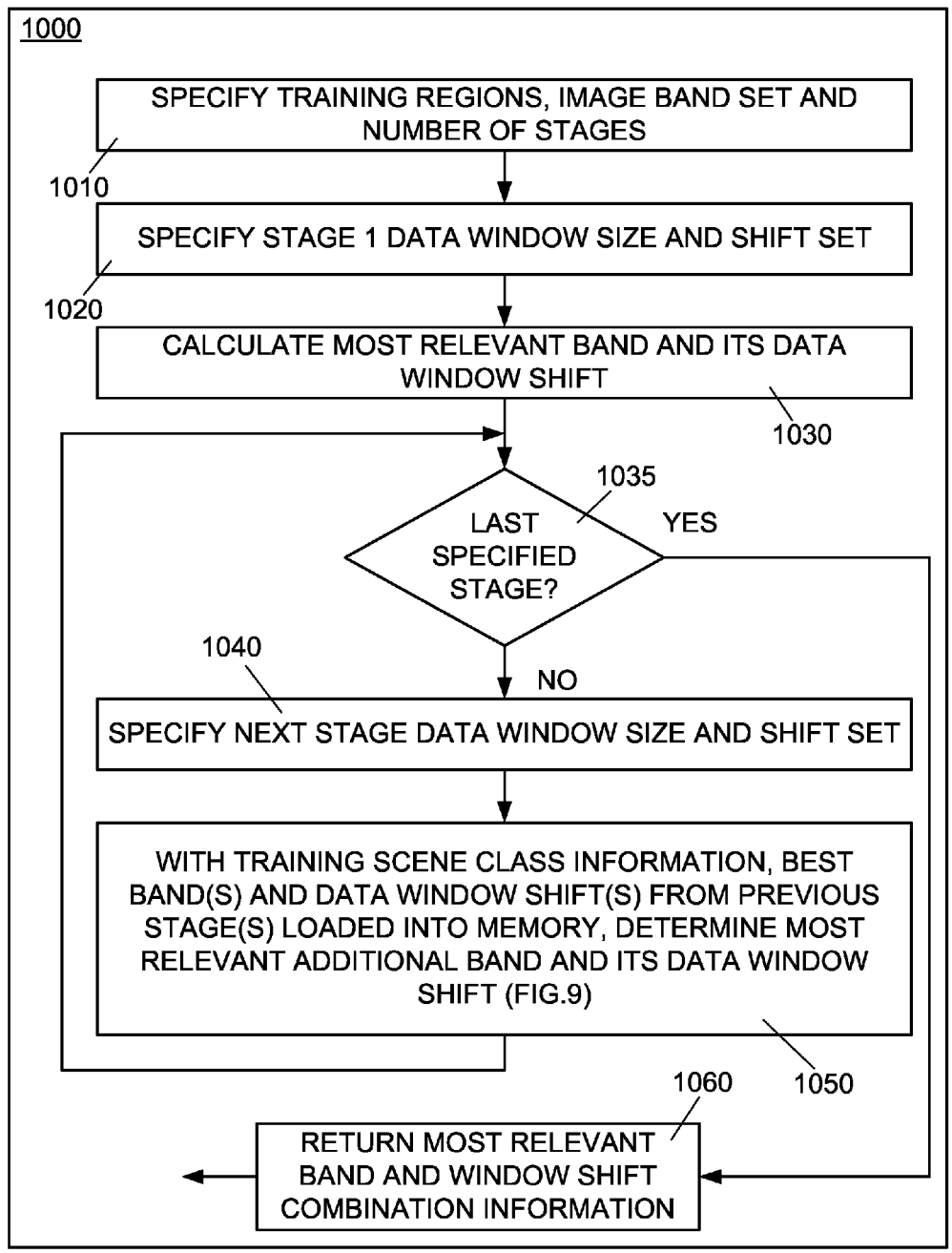
FIG. 10 is a flowchart illustrating one embodiment of a process that may be used to find the first band and data window within that band to incorporate additional bands.
Figure 11:
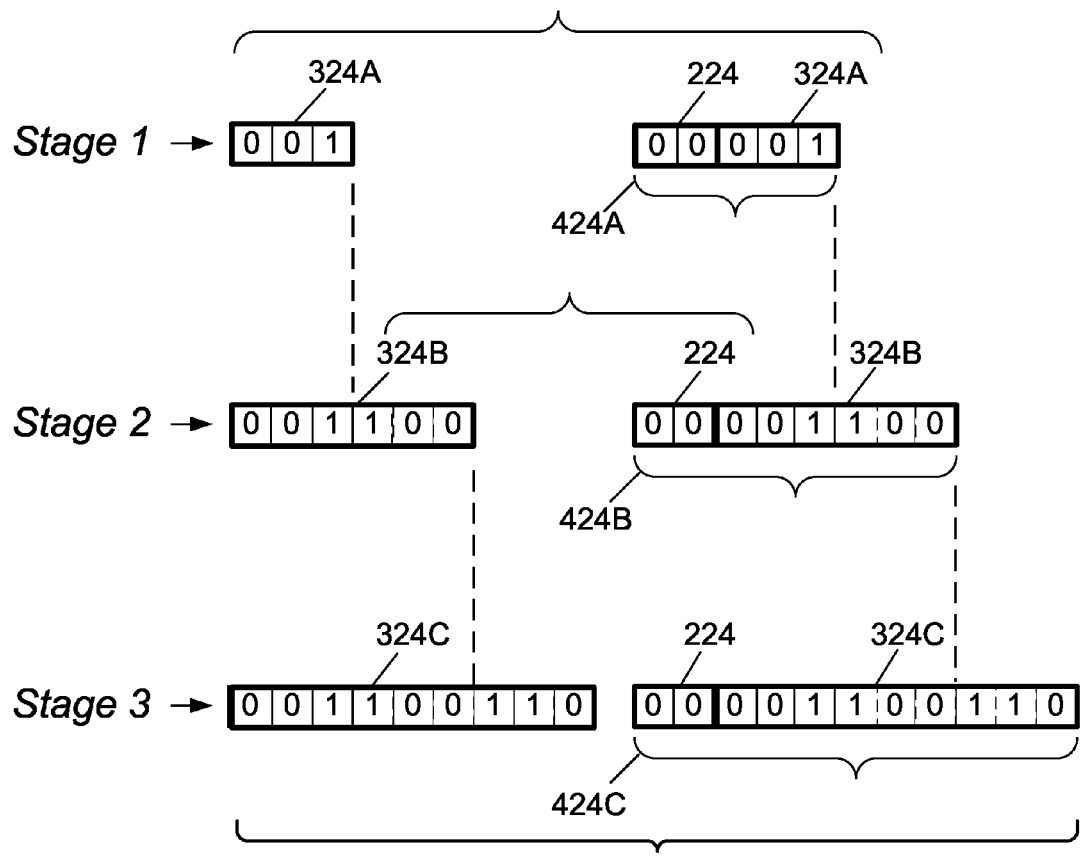
FIG. 11 is a diagrammatic representation of the data symbols for stages of the optimum band combination determination and typical combined classes and data c&d symbols for each of the stages.

Combining Data from More than One Source—FIGS. 1, 10 and 11

For the example case it has been shown how to determine a band and data window within that band that contains the most relevant information for distinguishing the classes of interest. However, often there is not enough information in a single band to correctly identify the classes with the desired probability. In such cases, following the initial search, which we will refer to as "Stage 1", additional information drawn from other sources may be useful in increasing this probability. By analogy, the human visual system normally combines information from three separate spectral bands, "red", "green", and "blue" to produce the sensation of "color" to help classify items of interest. For the example case, additional information must come from the available spectral bands 101: from another band and/or from a data window other than the one found in Stage 1.

To find additional relevant information to improve the likelihood of a successful classification, as shown in FIG. 10, one embodiment may successively apply the procedure used to find the first band and data window within that band to incorporate additional bands. As illustrated in FIG. 11, this is done by expanding the data symbols 324 at each stage so that they combine the best data found during earlier stages with trial data from other bands and/or data windows.

FIG. 10 is a flowchart illustrating one embodiment of a process 1000 that may be used to find the first band and data window within that band to incorporate additional bands. At a stage 1010, the training unit 1310 may specify training regions, image band set, and number of stages to be used in calculating relevance measures. At a stage 1020, the training unit 1310 may specify the Stage 1 data window size and shift set. At a stage 1030, the unit 1310 may calculate the most relevant band and its data window shift.

At a stage 1040, the unit 1410 may then begin to analyze the data window sizes and shift sets for other stages of the relevance measures calculation process. A next stage data window size and shift set may be specified. At a stage 1050, the unit 1410 may use the class information associated with the training scene (referred to later as the training space 1600), as well as the best band(s) and data window shift(s) from previous calculation stages to determine a most relevant data band and its associated window shift (position). At stage 1035, if it is determined that the process 1000 has analyzed all of the specified bands, at a stage 1060, information related to the most relevant band and window shift combination is returned by the most relevant window module 1420 to the identifying input selection module 1430.

FIG. 11 shows one embodiment of a three bit typical data symbol 324A for Stage 1 of an illustrative optimum band combination determination. It also shows a five bit combined class 224 and data 324A c&d symbol 424A for the same stage.

FIG. 11 also shows a six bit typical data symbol 324B for the second stage, "Stage 2", of the optimum band combination determination. It also shows an eight bit combined class 224 and data 324B c&d symbol 424B for the same stage. For this stage the data symbol at each location used for calculation of the relevance measure consists of a concatenation of data from the most relevant window of the most relevant band found during Stage 1 with trial data from other bands and/or data windows. For this example the six bit data symbol 324B serves to identify one of 64 histogram cells for accumulating the counts $n(d_k)$. Similarly the eight bit combined c&d value 424B points to one of 256 cells in a histogram for accumulating the counts $n(c_j d_k)$. However, for this example, since there are only three classes of interest, lake, forest and field, a maximum of 192 cells in the latter histogram can possibly be occupied.

FIG. 11 also shows a nine bit typical data symbol 324C for the third stage, "Stage 3", of the optimum band combination determination. It also shows an eleven bit combined class 224 and data 324C c&d symbol 424C for the same stage. For this stage the data symbol at each location used for calculation of the relevance measure consists of a concatenation of data from the most relevant window of the most relevant band found during Stage 1 and data from the most relevant window of the most relevant band found during Stage 2, with trial data from other bands and/or data windows. For this example the nine bit data symbol 324C serves to identify one of 512 potentially occupied histogram cells for accumulating the counts $n(d_k)$. Similarly the eleven bit combined c&d value 424C points to one of 2048 cells in a histogram for accumulating the counts $n(c_j d_k)$. However, for this example, since there are only three classes of interest, lake, forest and field, a maximum of 1536 cells in the latter histogram can possibly be occupied.

It will be obvious to those skilled in the art that the specific order of concatenation of the data symbols or the combined class and data symbols is not important as long as the order is consistent throughout each relevance measure determination. The purpose of the concatenated values is only to identify a specific unique histogram cell in which a count of like values is to be maintained.

An obvious consequence of increasing the number of bands to be combined in the calculation is that more histogram cells will be required to accommodate the increasing number of possible data symbols and the average number of counts per cell will decrease. Similarly, increasing the number of classes of interest will increase the number of histogram cells. However, the systems and methods described herein, by tying the number of histogram cells directly to the data having the most relevant information, avoids the histogram cell size estimation problem cited by Zeng et al. [2011].

Using Total Information Instead of Entropy—FIGS. 2B, 5B, 6 and 8-10

Since entropy H is the average amount of information necessary to identify a symbol, it is obvious that the average total information necessary to identify symbols at N independent locations is given by N×H. Multiplying Equ.(7) by N and simplifying results in the total amount of relevant information $I_R$ in a data subset being given by $$I_R(C \& D) = \sum_{j=1}^{J} \sum_{k=1}^{K} n(c_j d_k) \log(n(c_j d_k)) - \sum_{k=1}^{K} n(d_k) \log(n(d_k)) + N \log(N) - \sum_{j=1}^{J} n(c_j) \log(n(c_j)) \quad (10)$$

where:

$n(c_j)$ is the count in cell j of the class histogram 226, $n(d_k)$ is the count in cell k of the data symbol histogram 326, the number of times the kth data symbol occurs in windows of the training elements in the training data at the given window position and the given data band, $n(c_j d_k)$ is the count in cell jk of the joint class and data histogram 426, the number of times the kth data symbol occurs in the windows of training elements in the training data at the given window position and the given band in association with the jth class, and relevance=$I_R(C\&D)/N$.

When searching for the most relevant data subset, as long as the training regions and number of data samples N remain unchanged, finding the data subset that maximizes $I_R(C\&D)$ is equivalent to finding the subset that maximizes the right hand side of Equ.(7) and is often simpler to calculate. The calculation can be further simplified by noting that the second and fourth terms of Equ. (7) remain constant so it is only necessary to find the data subset that maximizes the variable term that we may define as $$I_V(C \& D) = \sum_{j=1}^{J} \sum_{k=1}^{K} n(c_j d_k) \log(n(c_j d_k)) - \sum_{k=1}^{K} n(d_k) \log(n(d_k)) \quad (11)$$

to find the most relevant data subset. This then serves as an alternative relevance measure to the relevance defined in Equ. (8) for determining the optimum data subset. Calculation of the individual components of the first term of this relevance measure 442 and their summation 444 for the example is illustrated in FIG. 6. The individual $n(d_k)\log(n(d_k))$ components of the second term are calculated in the usual manner from the $n(d_k)$ terms 326 shown in FIG. 5B.

In this embodiment this alternative relevance measure, $I_V(C \& D)$, is calculated at the same stage in the optimum data subset determination (FIG. 8) as the previously described entropy-based relevance and used in the same manner (FIG. 9) to determine that subset.

Use of Optimum Data Set.—FIG. 11

Once the most relevant data windows have been identified, this information may be used to guide the generation, collection, transmission, storage and/or use of new data intended for distinguishing the specified classes.

One of the characteristics of the data symbol set determined to be most relevant by the methods and systems described herein is that it is particularly well suited for classification using information theoretic methods such as those described in U.S. Pat. No. 4,567,610. Reference histograms can be created for each class using nothing other than the data symbol set from the most relevant windows within the most relevant bands selected from the same class training regions as were used to determine the most relevant data set.

These reference histograms can then be used for classification of test data consisting of data symbols 324 assembled from nothing other than data from the most relevant windows within the most relevant bands.

If the data to be collected will not be required for differentiation of classes other than those used for the optimum band determination, then there is no need to collect any data other than the specific bands and window positions within these bands found to be most relevant.

Determination of optimum set of bands and their data windows within these bands using the above procedure makes it possible to greatly simplify subsequent data collection, storage and/or analysis intended to differentiate the specified classes.

In certain embodiments, where the identifying inputs are inputs to an image display device, the most relevant four or fewer bands may be assigned to produce, for example, separate image planes of a false color image. In further embodiments, the most relevant three or fewer bands can also be assigned to individual color planes of an image to produce at least one of red, green and blue planes of the false color image. to be printed or displayed on a monitor or other device for human interpretation.

Other Applications

As another illustration of the method, images of a scene may be created by scanning it with one or more lasers and recording the reflected intensities. The ability to distinguish classes of interest is a function of the wavelength(s) of the light used. To assure adequate distinction of the classes of interest, the scene may first be imaged in a multiplicity of wavelengths and then the method described herein used to determine which wavelength or combination of wavelengths provides the best contrast. If one or more tunable lasers is used, the same laser(s) may be used for determining relevant wavelength bands and then be set to those relevant bands and used for the scanning.

In the foregoing examples the data bands represent photonic image measurements from a scene viewed at a variety of different wavelengths. However, sometimes the quantities as measured do not provide an adequate indication of conditions of interest on which to base decisions. Instead it may be necessary to perform operations on the measurements to create derived quantities that correlate better with said conditions. Common operations include calculation of statistical parameters, filtering, and combination with other measurements and or derived quantities. The method is clearly as applicable to "bands" derived from these operations as "raw" bands or combinations of these raw bands with data from other sources.

Although the methods and systems described herein are particularly well illustrated by the foregoing hyperspectral image example, they are also suitable for a wide variety of applications where determination of the most relevant data for classification would be an advantage. Rather than data locations being expressed in two-dimensional coordinate systems they may be expressed in higher order coordinate systems, or even lower order system such as time series. Several examples follow.

Devices that measure pressure, temperature, photonic, vibration, motion, electric field and current and other quantities are widely used to monitor conditions, control processes and aid in decision making. Sometimes the quantities as measured do not provide an adequate indication of conditions of interest on which to base decisions. Instead it may be necessary to perform operations on the measurements to create derived quantities that correlate better with said conditions. Common operations include calculation of statistical parameters, filtering, spectral analysis and combination with other measurements and or derived quantities. However, in most cases there is a virtually unlimited set of operations that could be performed to create derived quantities. Hence there is often a need to determine a set of quantities that is most likely to contain the information necessary to identify the conditions of interest. The methods and systems described herein are well suited to such determination.

For example acoustic or vibration sensing devices are often used to obtain data for classifying states. As one example U.S. Pat. No. 5,741,890 to Hill et al. describes a method of using acoustic and other sensing devices coupled to a conduit through which material flows. The signals from the sensing device vary with flow in the conduit. Various quantities derived from the sensor signals are used to first to train a neural network to correlate these quantities with known flows. The same quantities are then used as input to the trained network to determine the flow. If too many and/or irrelevant derived quantities are used in the analysis this can lead to poor performance. The methods and systems described herein may more efficiently identify less relevant quantities so that using them as input to the neural net can be avoided.

As another example accelerometers and other motion sensing devices are often attached to objects or humans to monitor their state. In one experiment data from 3-axis accelerometers attached to human subjects was recorded while the subjects participated in various specified forms of exercise. Various quantities were then derived that were predicted contain useful information for determining the type of exercise the subject was engaged in. The methods and systems described herein were then used to find the three most relevant of nine "raw data channels" (raw bands) and separately the three most relevant of five derived quantities (derived bands) for determination of the exercise type (class). In each case, by using only data from the three most relevant bands, it was possible to assign one band to each color on an RGB display device. In both cases clearly visible differences between the different types of exercise appeared on the display. Also in each case data from the three most relevant bands were used as input to a computer program to successfully train a computer to automatically classify the exercise type based on that most relevant data using the method described in described in U.S. Pat. No. 4,567,610. Other types of motion measuring devices, analysis of whose data and derived quantities might be aided by the methods and systems described herein, include but are not limited to gyroscopes, strain gauges, seismometers, range finders, speedometers.

In much the same way that the methods and systems described herein may be used to determine a most relevant subset of accelerometer data for monitoring and classifying human activity, the methods and systems described herein may be used to determine a most relevant subset of data from any other kind of sensor for monitoring and classifying data from any sensor or other source to monitor and classify the state of any living or inanimate objects.

A computer-based system 1300 for selection of identifying input for differentiating classes will now be described in detail with reference to FIGS. 13 to 16 of the accompanying drawings. The system 1300 has at least one training processor 1310 which hosts a training unit 1312 for conducting the computer-based selection of the identifying input, which may be sent to a testing system 1350 either directly or over a communication system such as Internet 1340. The testing system 1350 may use the identifying input for the testing applications described above.

The training processor 1310 is associated with a storage unit 1320 for storing instructions (also known as code 1322) and data 1324 for operating the training unit 1312. Users of the training system 1300 may communicate with the training processor 1310 directly or using their own computers such as user workstation 1330, which may be a desktop computer, laptop computer, tablet, or any other conventional or known computing devices.

The code 1322 for the operation of on embodiment of an identifying input process 1500 is diagrammatically shown in FIG. 14. The training code 1322 may have a training region specifying module 1410 configured to specify a plurality of training regions in the training space 1600 (shown in FIG. 16), a most relevant window module 1420 configured to determine a most relevant window in the training space 1600, and an identifying input selection module 1430 configured to select the most relevant window, together with its associated data band, window position, and window size, as identifying input for conducting class differentiation.

The code 1322 may also have an I/O module (not shown) to process communications to and from the training processor 1310 and a verification module (not shown) to verify user IDs and passwords. The training code 1322 may also have a display module (not shown) for facilitating the display of data, histograms, and other results developed by the code 1322.

Figure 16:
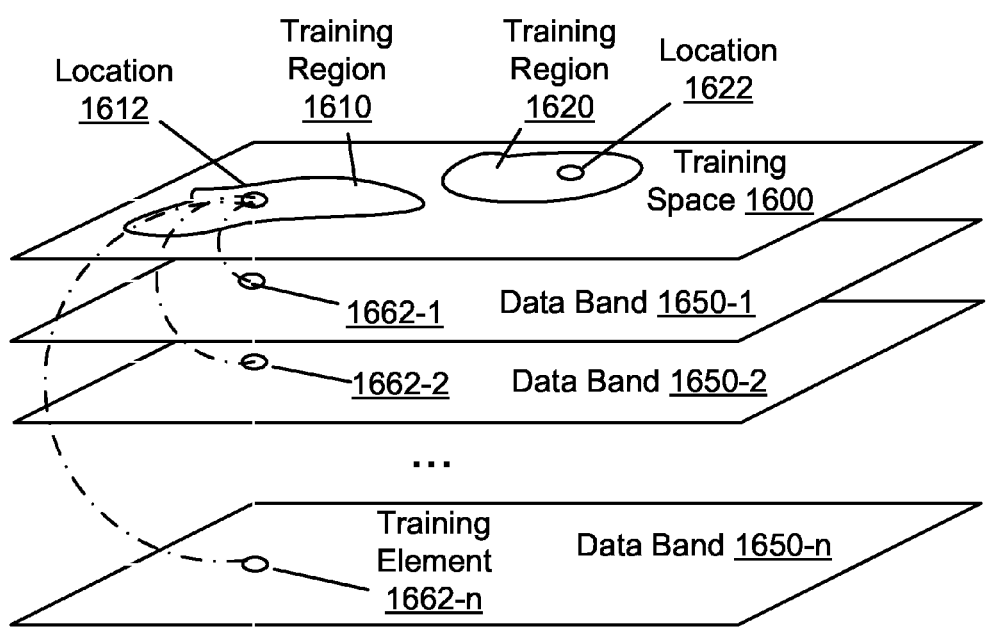
FIG. 16 is a diagrammatic representation of one embodiment of a training space and its associated data bands for use in selecting identifying input.

The training region specifying module 1410 is configured to specify training regions that are representative of a plurality of defined classes, with each of the training regions being associated with one of the defined classes. As shown in FIG. 16, training regions 1610, 1620 are defined in training space 1600. The training data associated with the training space 1600 may be organized into data bands according to selected definitions, such as data band 1650-1, data band 1650-2, up to data band 1650-$n$, one for each of the n data bands. Each the data bands may be associated with all of the training regions.

Data bands may be defined in any suitable manner, and training data may be organized into any convenient system. For example, in classifying in the field of image analysis, the bands may also be referred to as image planes or simply planes. In the field of time series analysis, the bands may be referred to as channels. In the field of seismology the bands may be referred to as traces. For purposes of simplicity, in this application, the term "band" is used in relation to the organization system for the training data of any type. It is to be understood that use of the term "band" is not meant to limit the type of training data, or field of analysis, or the scope of the invention described herein.

The training region specifying module 1410 is also configured to specify the training regions such that each of the training regions has at least one training location. For example, as shown in FIG. 16, training region 1610 has a training location 1612, and training region 1620 has a training location 1622. In addition, a training location has a training element in each of the data bands. Training location 1612 may have a training element 1662-1 in the data band 1650-1, a training element 1662-2 in the data band 1650-2, and a training element 1662-n in the data band 1650-n. Each training element has a training element size that comprises a count of the number of bits in the training element.

The most relevant window module 1420, which is configured to determine a most relevant window in the training space, may define multiple training windows in training elements in a known band in the training data. A window comprises a specified number of bits in a data element in the training data and has a value comprising a data symbol. The window also has a window size comprising a count of the number of bits in the window.

The window size may be any suitable size relative to the element size. In one embodiment, the window size may be the size of the training element, and so only one window is defined. In another embodiment, the window size is small relative to the element size. For example, in the embodiment described above and shown in FIG. 12, training element 310 has 16 bits and a 3 bit window size. The most relevant window module 1420 may define up to 14 windows {w0, w1, . . . , w13} of window size 3. The windows thus may have eight possible data symbols to represent the eight values {0,0,0} through {1,1,1}.

The most relevant window module 1420 is further configured to develop, from the multiple training windows, a set of relevance measures. A relevance measure for a first training window having a given window position and associated with a given data band may represent an extent of likelihood of correctly identifying class for a location in a test space (1) when an element of the location in the test space is in a data band that is defined according to the definition of the data band for the given training window, and (2) when a window of the element in the test space is in the same window position as the given training window. The most relevant window module 1420 is further configured to select, as the most relevant window, the window having the highest value relevance measure in the set of relevance measures.

The identifying input selection module 1430 is configured to select the most relevant window, together with its associated data band, window position, and window size, as the identifying input for class differentiation using testing system 1350.

The components depicted in the Figures may be operatively connected to one another via a network, such as the Internet 1340 or an intranet, or via any type of wired or wireless communication system. Connections may be implemented through a direct communication link, a local area network (LAN), a wide area network (WAN) and/or other suitable connections. The components of a computer or computer system may connect through, for example, a local bus interface.

One skilled in the art will appreciate that although only one or two of the components identified above is depicted in the Figures, any number of any of these components may be provided. Furthermore, one of ordinary skill in the art will recognize that there may be more than one training processor, and that functions provided by one or more components of any of the disclosed systems may be combined or incorporated into another component shown in the Figures.

One or more of the components depicted in FIG. 12 may be implemented in software on one or more computing systems. For example, they may comprise one or more applications, which may comprise one or more computer-readable instructions which, when executed by a processor, cause a computer to perform steps of a method. Further, while the modules are shown in the figures as associated with a specific processor, it is to be understood that the module may operate on any other processor shown or not shown. Further, the instructions for the module may be stored on the storage device associated with the specific processor or any other storage device, or they may be stored on one or more storage devices, and transferred to run on the shown processor or other or multiple processors. Computer-readable instructions may be stored on a computer-readable medium, such as a memory or disk. Such media typically provide non-transitory storage. Alternatively, one or more of the components depicted in FIG. 12 may be hardware components or combinations of hardware and software such as, for example, special purpose computers or general purpose computers. A computer or computer system may also comprise an internal or external database.

Figure 15:
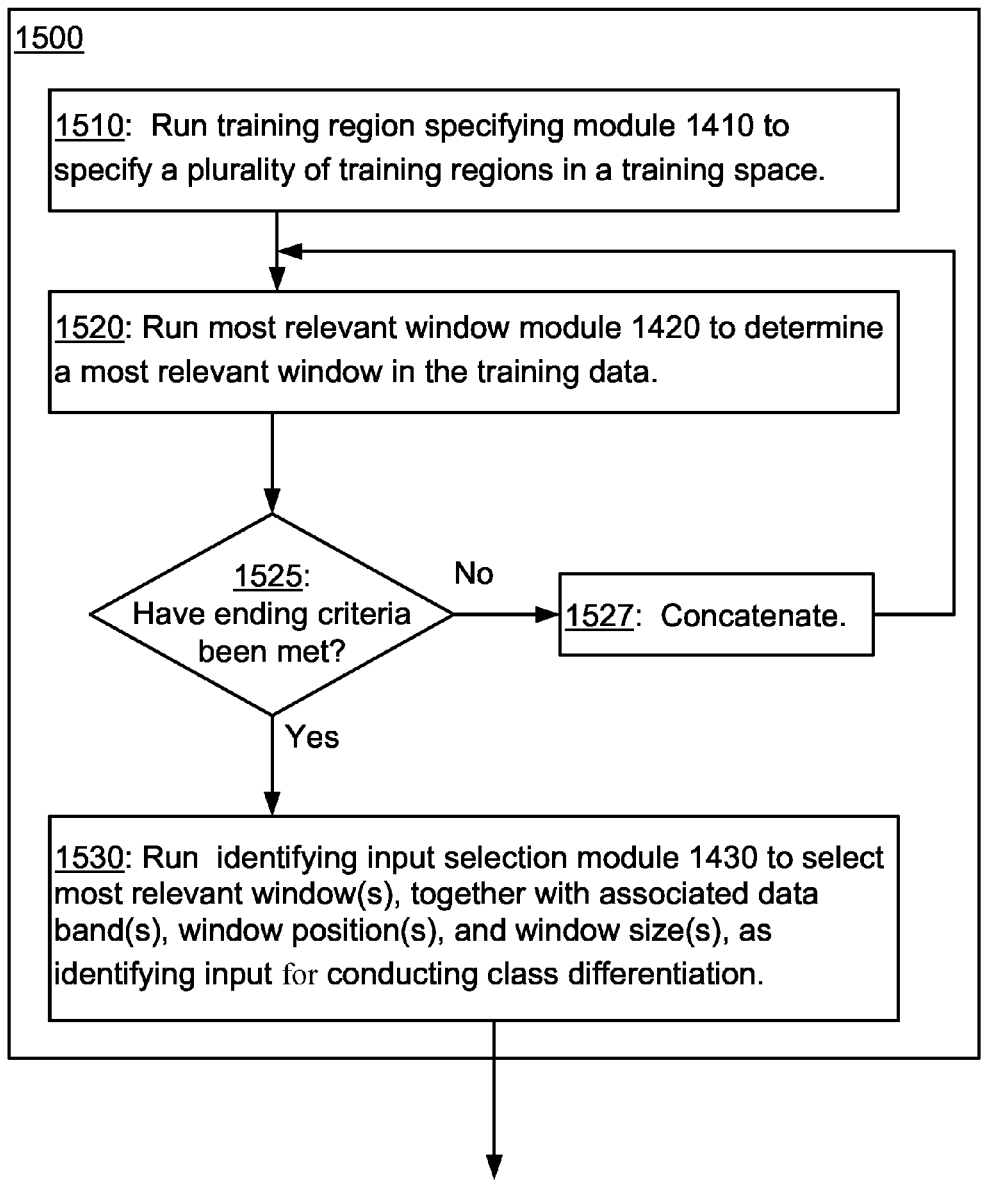
FIG. 15 is a flow chart of one embodiment of the process 1500 for selecting identifying input.

FIG. 15 is a diagram showing the operation of the identifying input process 1500. In operation, the process 1500 may start in a stage 1510 by the training unit 1312 running the training region specifying module 1410 to specify a plurality of training regions in a training space according to the process described above. In a stage 1520, the training unit 1312 runs the most relevant window module 1420 to determine a most relevant window in the training data as described above.

In a stage 1525, process ending criteria may be tested to determine whether a sufficient number of most relevant windows have been obtained. The process ending criteria may be any criteria that are suitable. For example, one criterion may be the highest value relevance measure of a most relevant window reaching a predetermined first value. Another criterion may be the difference between the value of relevance measure of one most relevant window and a previously most recently selected most relevant window being less than a predetermined third value. Another criterion may be the number of data windows in the set of most relevant windows reaching, a predetermined second value or the number of bands associated with the set of most relevant windows reaching a predetermined fourth value.

If the ending process criteria have not been met, in stage 1527, data may be prepared for a repetition of the stage 1520 to determine additional most relevant windows in the training data as described above. In the stage 1527, the data for creating an additional set of relevance measures may be developed from training data associated with a previously selected relevant window combined with the data symbol of the previously selected most relevant window. In one embodiment, the process uses the most recently selected most relevant window as the previously selected most relevant window.

The training data combination process, which in one embodiment, may be a concatenation, forms additional combined training data having additional training elements and additional training windows associated with the additional training elements. It also forms additional combined data symbols in the additional training elements.

The combined training data and combined data training elements are used by module 1420 to develop an additional set of relevance measures as described above with reference to the equations above disclosed. An additional relevance measure developed by the most relevant window module 1420 for an additional training window associated with an additional element may represent an extent of likelihood of correctly identifying class for a location in a testing space. The most relevant window module 1420 may then select, as the additional most relevant window, the window having the highest value relevance measure in the additional set of relevance measures.

When the additional most relevant window is selected, the ending process criteria are again tested in stage 1525. If they have now been met, in stage 1530, the identifying input selection module 1430 may select the most relevant window(s) identified by stage 1520, together with associated data band(s), window position(s), and window size(s), as the identifying input for conducting class differentiation.

It may be seen that the embodiments of the systems and methods disclosed here may be used to simply and efficiently identify relevant data as well as more precisely identify parameters of the relevant data. A reduction in the amount of data that needs to be inter alia generated, collected, transmitted, stored, and/or processed for future classification, results in reduction in cost, time, and effort of selecting identifying input for class differentiation, and improvement of the predictive quality of the identifying input.

One of skill in the art will appreciate that the above-described stages may be embodied in distinct software modules. Although the disclosed components have been described above as being separate and consolidated units, one of ordinary skill in the art will recognize that functionalities provided by one or more units may be combined or separated, at the option of the developer. As one of ordinary skill in the art will appreciate, one or more of units may be optional and may be omitted from implementations in certain embodiments.

The foregoing description has been presented for purposes of illustration. It is not exhaustive and does not limit the invention to the precise forms or embodiments disclosed. Modifications and adaptations of the methods and systems described herein will be apparent to those skilled in the art from consideration of the specification and practice of the disclosed embodiments. For example, the described implementations may be implemented in software, hardware, or a combination of hardware and software. Examples of hardware include computing or processing systems, such as personal computers, servers, laptops, tablets, mainframes, micro-processors, and processing systems within so-called "smart" phones. It is intended that the specification and examples be considered as exemplary only, with a true scope and spirit of the invention being indicated by the following claims.

The invention claimed is:

1. A method for computer-based selection of identifying input for differentiating classes, the method comprising:
   specifying, by a training region specifying module, a plurality of training regions in a training space,
      wherein the training regions are representative of a plurality of defined classes,
      wherein training data associated with the training space are organized into data bands according to selected definitions,
      wherein each of the training regions has at least one training location with a training element associated with each of the data bands,
      wherein a first training element has a training element size that comprises a count of the number of bits in the first training element and a first training window at a window position,
      wherein the first training window has a value comprising a data symbol and a window size comprising a count of the number of bits in the first training window, and
      wherein the window size is less than or equal to the training element size;
   determining a relevance measure for the first training window, wherein the relevance measure represents an extent of likelihood of correctly identifying class for a test location based on:
      a window within a test element associated with the test location and at the window position of the first training window,
      a data band with which the test element is associated, and
      the frequency of occurrence of data symbols in training windows at the window position of the first training window; and
   selecting, by a most relevant window module, the first training window as a most relevant window when the relevance measure of the first training window is greatest relative to relevance measures for other training windows,
   selecting, by an identifying input selection module, the most relevant window, together with its associated data band, window position, and window size, as the identifying input for conducting the class differentiation.

2. The method of claim 1, further comprising:
   determining, by the most relevant window module, an additional most relevant window for the training data by:
      developing an additional set of relevance measures, wherein a relevance measure for an additional training window associated with an additional element represents an extent of likelihood of correctly identifying class for a second test location, and
      selecting, as the additional most relevant window, a first additional training window when the relevance measure of the first additional training window has the highest value relevance measure in the additional set of relevance measures; and
   including, by the identifying input selection module, the additional most relevant window, together with its associated data band, window position, and window size, as an additional identifying input for conducting the class differentiation.

3. The method of claim 2, wherein developing the additional set of relevance measures by the most relevant window module further comprises:
   combining training data associated with a previously selected most relevant window with the data symbol of the previously selected most relevant window, to form additional combined training data having additional training elements, additional training windows associated with the additional training elements, and additional combined data symbols in the additional training elements;
   developing the additional set of relevance measures from the additional combined training data and the additional training windows.

4. The method of claim 3, wherein the previously selected most relevant window comprises a most recently selected most relevant window.

5. The method of claim 3, wherein combining the training data associated with the previously selected most relevant window with the data symbol of the previously selected most relevant window by the most relevant window module further comprises:
   concatenating the training data associated with the previously selected most relevant window with the data symbol of the previously selected most relevant window.

6. The method of claim 2, further comprising selecting additional most relevant windows until the occurrence of at least one of the following events:
   a relevance measure of a determined most relevant window reaches a predetermined first value;
   the number of training windows in the set of most relevant windows reaches a predetermined second value;
   the difference in value between a value of relevance measure of a selected additional most relevant window and its previously most recently selected most relevant window is less than a predetermined third value; and
the number of data bands associated with the set of most relevant windows reaches a predetermined fourth value.

7. The method of claim 1, wherein at least one of the data bands has a definition that is based on the definition of at least one other data band.

8. The method of claim 1, further comprising selecting the identifying input without reference to data in the training data that is not associated with the most relevant window.

9. The method of claim 1, wherein the window size comprises a small number of bits relative to the element size.

10. The method of claim 1, wherein the relevance measure for a given window having a given window position and associated with a given data band is defined by:

relevance=$H(C)+H(D)-H(C\&D)$, where $$H(C) = -\sum_{j=1}^{J} p(c_j)\log_b(p(c_j)),$$

with
C being a set of the defined classes,
J being the number of defined classes,
j being a class index,
$p(c_j)$ representing a frequency of occurrence of class $c_j$ in the training regions, and
b being the base of the selected logarithm;

$$H(D) = -\sum_{k=1}^{K} p(d_k)\log_b(p(d_k)),$$

with
D being a set of possible data symbols,
K being the number of possible data symbols,
$d_k$ being the kth data symbol in the set D,
and
$p(d_k)$ representing a frequency of occurrence of the data symbol $d_k$ in windows of the training elements in the training data at the given window position and the given data band; and $$H(C\&D) = -\sum_{j=1}^{J}\sum_{k=1}^{K} p(c_jd_k)\log_b(p(c_jd_k)),$$

with $p(c_jd_k)$ representing a frequency of occurrence of the kth data symbol in the windows of the training elements in the training data at the given window position and the given data band in association with the jth class.

11. The method of claim 1, wherein the relevance measure for a given window having a given window position and associated with a given data band is defined by $$I_V(C\&D) = \sum_{j=1}^{J}\sum_{k=1}^{K} n(c_jd_k)\log_b(n(c_jd_k)) - \sum_{k=1}^{K} n(d_k)\log_b(n(d_k)),$$

where
C is a set of the defined classes;
J is the number of defined classes;
j is a class index;
$c_j$ is the jth class in the set C;
D is a set of possible data symbols;
K is the number of possible data symbols;
$d_k$ is the kth data symbol in the set D;
b is a base of the selected logarithm;
$n(d_k)$ is the number of times the kth data symbol occurs in windows of the training elements in the training data at the given window position and the given data band; and
$n(c_jd_k)$ is the number of times the kth data symbol occurs in the windows of training elements in the training data at the given window position and the given band in association with the jth class.

12. The method of claim 1, further comprising using a data histogram in determining the relevance measure, and using data symbols as pointers into the data histogram.

13. The method of claim 1, further comprising selecting a set of most relevant data windows to select spectral band information from a hyperspectral or multispectral image.

14. The method of claim 1, further comprising selecting a set of most relevant windows to specify bands for a tunable laser source.

15. The method of claim 1, further comprising selecting a set of most relevant windows to establish references for use in classifying regions of a test space based on the data bands and window position parameters associated with the set of most relevant windows.

16. The method of claim 1, further comprising selecting a set of most relevant windows to establish references for use in classifying regions of a test space based on concatenated data from the data bands and window position parameters associated with of the set of most relevant windows.

17. The method of claim 1,
wherein the identifying inputs further comprise most relevant windows associated with-four or fewer data bands, and
wherein the identifying inputs further comprise inputs to an image display device for producing separate image planes of a false color image.

18. The method of claim 17,
wherein the identifying inputs further comprise most relevant windows associated with-three or fewer data bands,
wherein the image display device comprises an image display monitor, and
wherein the separate image planes comprise at least one of red, green, and blue planes of the false color image.

19. The method of claim 1, wherein the training data comprise signals from acoustic or vibration sensing devices, and wherein the identifying inputs further comprise optimum parameters for acoustic or vibration based classification.

20. The method of claim 1, wherein the training data comprise signals from electromagnetic field sensing devices, and wherein the identifying inputs comprise optimum parameters for electromagnetic field based classification.

21. The method of claim 1, wherein the training data comprise signals from pressure sensing devices, and wherein the identifying inputs further comprise optimum parameters for pressure based classification.

22. The method of claim 1, wherein the training data comprise signals from temperature sensing devices, and wherein the identifying inputs further comprise optimum parameters for temperature based classification.

23. The method of claim 1, wherein the training data comprise signals from motion sensing devices, and wherein the identifying inputs further comprise optimum parameters for motion-based classification.

24. The method of claim 1, wherein the training data comprise signals from sensors at one or more selected times, and wherein the training locations represent time-series data.

25. The method of claim 1,
wherein a given window for a given training element window has a value comprising a class symbol representing the class with which the given training element is associated; and
further comprising using a concatenated combination of class and data symbols to develop a relevance measure for the given window.

26. The method of claim 25, further comprising using a joint class and data histogram in developing the relevance measure for the given window, wherein the concatenated combination of class and data symbols is used as a pointer into the joint class and data histogram.

27. A system for computer-based selection of identifying input for differentiating classes, comprising:
a processor; and
a non-transitory computer-readable medium encoding instructions for selecting the identifying input and for execution by the processor, the instructions including:
a training region specifying module configured to specify a plurality of training regions in a training space,
wherein the training regions are representative of a plurality of defined classes,
wherein training data associated with the training space are organized into data bands according to selected definitions,
wherein each of the regions has at least one training location with a training element associated with each of the data bands,
wherein a first training element has a training element size that comprises a count of the number of bits in the first training element and a first training window at a window position,
wherein the first training window has a value comprising a data symbol and a window size comprising a count of the number of bits in the first training window, and
wherein the window size is less than or equal to the training element size;
a most relevant window module configured to determine a most relevant window in the training space,
wherein the most relevant window module is configured to determine a relevance measure for the first training window, wherein the relevance measure represents an extent of likelihood of correctly identifying class for a test location based on:
a window within a test element associated with the test location and at the window position of the first training window,
a data band with which the test element is associated, and
the frequency of occurrence of data symbols in training windows at the window position of the first training window; and
wherein the most relevant window module is further configured to select the first training window as a most relevant window when the relevance measure of the first training window is greatest relative to relevance measures for other training windows; and
an identifying input selection module configured to select the most relevant window, together with its associated data band, window position, and window size, as the identifying input for conducting the class differentiation.

28. A computer program embodied on a non-transitory computer readable medium for computer-based selection of identifying input for differentiating classes,
wherein the computer program comprises modules encoding interrelated and interdependent processes, including a training region specifying module, a most relevant window module, and an identifying input selection module, and
wherein the computer program is configured to perform a method comprising:
specifying, by the training region specifying module, a plurality of training regions in a training space,
wherein the training regions are representative of a plurality of defined classes,
wherein training data associated with the training space are organized into data bands according to selected definitions,
wherein each of the training regions has at least one training location with a training element associated with each of the data bands,
wherein a first training element has a training element size that comprises a count of the number of bits in the first training element and a first training window at a window position,
wherein the first training window has a value comprising a data symbol and a window size comprising a count of the number of bits in the first training window, and
wherein the window size is less than or equal to the training element size;
determining, by the most relevant window module, a relevance measure for the first training window, wherein the relevance measure represents an extent of likelihood of correctly identifying class for a test location based on:
a window within a test element associated with the test location and at the window position of the first training window,
a data band with which the test element is associated, and
the frequency of occurrence of data symbols in training windows at the window position of the first training window; and
selecting, by the most relevant window module, the first training window as a most relevant window when the relevance measure of the first training window is greatest relative to relevance measures for other training windows,
selecting, by the identifying input selection module, the most relevant window, together with its associated data band, window position, and window size, as the identifying input for conducting the class differentiation.

* * * * *